United States Patent
Hinderliter et al.

(10) Patent No.: US 12,142,928 B2
(45) Date of Patent: *Nov. 12, 2024

(54) INTEGRATED MOBILE POWER UNIT FOR HYDRAULIC FRACTURING

(71) Applicant: U.S. Well Services, LLC, Houston, TX (US)

(72) Inventors: Brandon N. Hinderliter, Houston, TX (US); Jared Oehring, Houston, TX (US)

(73) Assignee: U.S. Well Services, LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/209,761

(22) Filed: Jun. 14, 2023

(65) Prior Publication Data

US 2023/0323786 A1 Oct. 12, 2023

Related U.S. Application Data

(63) Continuation of application No. 17/540,807, filed on Dec. 2, 2021, now Pat. No. 11,713,690, which is a (Continued)

(51) Int. Cl.
*H02J 3/46* (2006.01)
*E21B 41/00* (2006.01)
(Continued)

(52) U.S. Cl.
CPC ............ *H02J 3/46* (2013.01); *E21B 41/0085* (2013.01); *E21B 43/2607* (2020.05);
(Continued)

(58) Field of Classification Search
None
See application file for complete search history.

(56) References Cited

U.S. PATENT DOCUMENTS

| | | |
|---|---|---|
| 1,541,601 A | 6/1925 | Tribe |
| 1,656,861 A | 1/1928 | Leonard |

(Continued)

FOREIGN PATENT DOCUMENTS

| | | |
|---|---|---|
| CA | 2406801 A1 | 11/2001 |
| CA | 2482943 A1 | 10/2003 |

(Continued)

OTHER PUBLICATIONS

Arvani et al., "Design and Development of an Engineering Drilling Simulator and Application for Offshore Drilling for MODUs and Deepwater Environments," Society of Petroleum Engineers, SPE-170301-MS, 2014, 17 pages.

(Continued)

*Primary Examiner* — Ryan D. Coyer
(74) *Attorney, Agent, or Firm* — Hogan Lovells US LLP

(57) ABSTRACT

A hydraulic fracturing system is disclosed as including a singular mobile platform of at least one mobile power unit (MPU) and at least one first switch gear that is configured to handle electric power from the MPU. The MPU is configured to generate voltage that matches the capabilities of an electrical bus from the at least one switch gear such that a combined electrical current generated as a result of the generated voltage and required load is provided to the electrical bus to the components of the hydraulic fracturing system. Further, the hydraulic fracturing system may include electrical fracturing equipment with at least one second switch gear to support the at least one first switch gear in handling electric power from the MPU. A datavan may be included in the system to control load shedding, load sharing, and power distribution for the electrical fracturing equipment comprising the at least one second switch gear.

20 Claims, 11 Drawing Sheets

Related U.S. Application Data continuation of application No. 16/443,273, filed on Jun. 17, 2019, now Pat. No. 11,211,801.

(60) Provisional application No. 62/685,797, filed on Jun. 15, 2018.

(51) Int. Cl.
*E21B 43/16* (2006.01)
*E21B 43/26* (2006.01)
*F01D 15/10* (2006.01)
*G05B 15/02* (2006.01)

(52) U.S. Cl.
CPC ............ *F01D 15/10* (2013.01); *G05B 15/02* (2013.01); *E21B 43/16* (2013.01)

(56) References Cited

U.S. PATENT DOCUMENTS

| | | | |
|---|---|---|---|
| 1,671,436 A | 5/1928 | Melott |
| 1,743,771 A | 1/1930 | Hall et al. |
| 1,967,466 A | 7/1934 | Damsel |
| 2,004,077 A | 6/1935 | McCartney et al. |
| 2,183,364 A | 12/1939 | Bailey |
| 2,220,622 A | 11/1940 | Homer |
| 2,237,812 A | 4/1941 | De Blieux et al. |
| 2,248,051 A | 7/1941 | Armstrong |
| 2,407,796 A | 9/1946 | Page |
| 2,416,848 A | 3/1947 | Stewart |
| 2,610,741 A | 9/1952 | Schmid |
| 2,753,940 A | 7/1956 | Bonner |
| 2,852,600 A | 9/1958 | Jenkins, Jr. |
| 3,055,682 A | 9/1962 | Bacher et al. |
| 3,061,039 A | 10/1962 | Peters |
| 3,066,503 A | 12/1962 | Fleming et al. |
| 3,116,086 A | 12/1963 | Barengoltz |
| 3,302,069 A | 1/1967 | Webster |
| 3,334,495 A | 8/1967 | Jensen et al. |
| 3,347,570 A | 10/1967 | Roessler |
| 3,722,595 A | 3/1973 | Kiel |
| 3,764,233 A | 10/1973 | Strickland |
| 3,773,140 A | 11/1973 | Mahajan et al. |
| 3,794,846 A | 2/1974 | Schlicher et al. |
| 3,837,179 A | 9/1974 | Barth |
| 3,849,662 A | 11/1974 | Blaskowski et al. |
| 3,878,884 A | 4/1975 | Raleigh |
| 3,881,551 A | 5/1975 | Terry et al. |
| 3,967,841 A | 7/1976 | Kendrick et al. |
| 4,037,431 A | 7/1977 | Sugimoto |
| 4,100,822 A | 7/1978 | Rosman |
| 4,151,575 A | 4/1979 | Hogue |
| 4,226,299 A | 10/1980 | Hansen |
| 4,265,266 A | 5/1981 | Kierbow et al. |
| 4,432,064 A | 2/1984 | Barker et al. |
| 4,442,665 A | 4/1984 | Fick et al. |
| 4,456,092 A | 6/1984 | Kubozuka et al. |
| 4,506,982 A | 3/1985 | Smithers et al. |
| 4,512,387 A | 4/1985 | Rodriguez et al. |
| 4,529,887 A * | 7/1985 | Johnson .................. F02C 6/18 |
| | | 290/40 C |
| 4,538,916 A | 9/1985 | Zimmerman |
| 4,562,360 A | 12/1985 | Fujimoto |
| 4,676,063 A | 6/1987 | Goebel et al. |
| 4,759,674 A | 7/1988 | Schroder et al. |
| 4,783,038 A | 11/1988 | Gilbert et al. |
| 4,793,386 A | 12/1988 | Sloan |
| 4,845,981 A | 7/1989 | Pearson |
| 4,898,473 A | 2/1990 | Stegemoeller et al. |
| 4,922,463 A | 5/1990 | Del Zotto et al. |
| 5,004,400 A | 4/1991 | Handke |
| 5,006,044 A | 4/1991 | Walker, Sr. et al. |
| 5,025,861 A | 6/1991 | Huber et al. |
| 5,050,673 A | 9/1991 | Baldridge |
| 5,114,239 A | 5/1992 | Allen |
| 5,130,628 A | 7/1992 | Owen |
| 5,131,472 A | 7/1992 | Dees et al. |
| 5,172,009 A | 12/1992 | Mohan |
| 5,189,388 A | 2/1993 | Mosley et al. |
| 5,230,366 A | 7/1993 | Marandi |
| 5,293,947 A | 3/1994 | Stratton |
| 5,334,899 A | 8/1994 | Skybyk |
| 5,366,324 A | 11/1994 | Arlt et al. |
| 5,422,550 A | 6/1995 | McClanahan et al. |
| 5,433,243 A | 7/1995 | Griswold et al. |
| 5,439,066 A | 8/1995 | Gipson |
| 5,517,822 A | 5/1996 | Haws et al. |
| 5,548,093 A | 8/1996 | Sato |
| 5,549,285 A | 8/1996 | Collins |
| 5,590,976 A | 1/1997 | Kilheffer et al. |
| 5,655,361 A | 8/1997 | Kishi |
| 5,736,838 A | 4/1998 | Dove et al. |
| 5,755,096 A | 5/1998 | Holleyman |
| 5,790,972 A | 8/1998 | Kohlenberger |
| 5,791,636 A | 8/1998 | Loziuk |
| 5,798,596 A | 8/1998 | Lordo |
| 5,865,247 A | 2/1999 | Peterson et al. |
| 5,879,137 A | 3/1999 | Yie |
| 5,894,888 A | 4/1999 | Wiemers et al. |
| 5,907,970 A | 6/1999 | Havlovick et al. |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,138,764 A | 10/2000 | Scarsdale et al. |
| 6,142,878 A | 11/2000 | Barin |
| 6,164,910 A | 12/2000 | Mayleben |
| 6,202,702 B1 | 3/2001 | Ohira et al. |
| 6,208,098 B1 | 3/2001 | Kume et al. |
| 6,254,462 B1 | 7/2001 | Kelton et al. |
| 6,271,637 B1 | 8/2001 | Kushion |
| 6,315,523 B1 | 11/2001 | Mills |
| 6,406,011 B1 | 6/2002 | Kosar et al. |
| 6,477,852 B2 | 11/2002 | Dodo et al. |
| 6,484,490 B1 | 11/2002 | Olsen et al. |
| 6,491,098 B1 | 12/2002 | Dallas |
| 6,510,695 B1 | 1/2003 | Fisher |
| 6,529,135 B1 | 3/2003 | Bowers et al. |
| 6,626,646 B2 | 9/2003 | Rajewski |
| 6,633,727 B2 | 10/2003 | Henrie et al. |
| 6,719,900 B2 | 4/2004 | Hawkins |
| 6,765,304 B2 * | 7/2004 | Baten .................. F02B 63/04 |
| | | 290/1 A |
| 6,776,227 B2 | 8/2004 | Beida et al. |
| 6,788,022 B2 | 9/2004 | Sopko et al. |
| 6,802,690 B2 | 10/2004 | Han et al. |
| 6,808,303 B2 | 10/2004 | Fisher |
| 6,837,910 B1 | 1/2005 | Yoshikawa et al. |
| 6,931,310 B2 | 8/2005 | Shimizu et al. |
| 6,936,947 B1 | 8/2005 | Leijon et al. |
| 6,985,750 B1 | 1/2006 | Vicknair et al. |
| 7,082,993 B2 | 8/2006 | Ayoub et al. |
| 7,170,262 B2 | 1/2007 | Pettigrew |
| 7,173,399 B2 | 2/2007 | Sihler et al. |
| 7,308,933 B1 | 2/2007 | Mayfield et al. |
| 7,279,655 B2 | 10/2007 | Blutke et al. |
| 7,309,835 B2 | 12/2007 | Morrison et al. |
| 7,312,593 B1 | 12/2007 | Streicher et al. |
| 7,336,514 B2 | 2/2008 | Amarillas et al. |
| 7,341,287 B2 | 3/2008 | Gibb et al. |
| 7,445,041 B2 | 11/2008 | O'Brien |
| 7,494,263 B2 | 2/2009 | Dykstra et al. |
| 7,500,642 B2 | 3/2009 | Cunningham et al. |
| 7,525,264 B2 | 4/2009 | Dodge |
| 7,563,076 B2 | 7/2009 | Brunet et al. |
| 7,581,379 B2 | 9/2009 | Yoshida et al. |
| 7,675,189 B2 * | 3/2010 | Grenier .................. F03D 15/00 |
| | | 290/43 |
| 7,683,499 B2 | 3/2010 | Saucier |
| 7,717,193 B2 | 5/2010 | Egilsson et al. |
| 7,770,396 B2 | 8/2010 | Roby et al. |
| 7,795,830 B2 | 9/2010 | Johnson |
| 7,807,048 B2 | 10/2010 | Collette |
| 7,835,140 B2 | 11/2010 | Mori et al. |

(56) References Cited

U.S. PATENT DOCUMENTS

| | | | |
|---|---|---|---|
| 7,845,413 B2 | 12/2010 | Shampine et al. |
| 7,900,893 B2 | 3/2011 | Teurlay et al. |
| 7,926,562 B2 | 4/2011 | Poitzsch et al. |
| 7,894,757 B2 | 7/2011 | Matsuno |
| 7,977,824 B2 | 7/2011 | Halen et al. |
| 8,037,936 B2 | 10/2011 | Neuroth et al. |
| 8,054,084 B2 | 11/2011 | Schulz et al. |
| 8,083,504 B2 | 12/2011 | Williams et al. |
| 8,091,928 B2 | 1/2012 | Carrier et al. |
| 8,096,354 B2 | 1/2012 | Poitzsch et al. |
| 8,096,891 B2 | 1/2012 | Lochtefeld et al. |
| 8,139,383 B2 | 3/2012 | Efraimsson et al. |
| 8,146,665 B2 | 4/2012 | Neal |
| 8,154,419 B2 | 4/2012 | Daussin et al. |
| 8,221,513 B2 | 7/2012 | Ariyapadi et al. |
| 8,232,892 B2 | 7/2012 | Overholt et al. |
| 8,261,528 B2 | 9/2012 | Chillar et al. |
| 8,272,439 B2 | 9/2012 | Strickland |
| 8,310,272 B2 | 11/2012 | Quarto |
| 8,354,817 B2 | 1/2013 | Yeh et al. |
| 8,474,521 B2 | 7/2013 | Kajaria et al. |
| RE44,444 E | 8/2013 | Dole et al. |
| 8,506,267 B2 | 8/2013 | Gambier et al. |
| 8,534,235 B2 | 9/2013 | Chandler |
| 8,556,302 B2 | 10/2013 | Dole |
| 8,573,303 B2 | 11/2013 | Kerfoot |
| 8,596,056 B2 | 12/2013 | Woodmansee et al. |
| 8,616,005 B1 | 12/2013 | Cousino, Sr. |
| 8,616,274 B2 | 12/2013 | Belcher et al. |
| 8,646,521 B2 | 2/2014 | Bowen |
| 8,692,408 B2 | 4/2014 | Zhang et al. |
| 8,727,068 B2 | 5/2014 | Bruin |
| 8,760,657 B2 | 6/2014 | Pope et al. |
| 8,763,387 B2 | 7/2014 | Schmidt |
| 8,774,972 B2 | 7/2014 | Rusnak et al. |
| 8,789,601 B2 | 7/2014 | Broussard et al. |
| 8,795,525 B2 | 8/2014 | McGinnis et al. |
| 8,800,652 B2 | 8/2014 | Bartko et al. |
| 8,807,960 B2 | 8/2014 | Stephenson et al. |
| 8,838,341 B2 | 9/2014 | Kumano |
| 8,851,860 B1 | 10/2014 | Mail |
| 8,857,506 B2 | 10/2014 | Stone, Jr. et al. |
| 8,893,787 B2 | 11/2014 | Tips et al. |
| 8,899,940 B2 | 12/2014 | Laugemors et al. |
| 8,905,056 B2 | 12/2014 | Kendrick |
| 8,905,138 B2 | 12/2014 | Lundstedt et al. |
| 8,997,904 B2 | 4/2015 | Cryer et al. |
| 9,018,881 B2 | 4/2015 | Mao et al. |
| 9,051,822 B2 | 6/2015 | Ayan et al. |
| 9,051,923 B2 | 6/2015 | Kuo |
| 9,061,223 B2 | 6/2015 | Winborn |
| 9,062,545 B2 | 6/2015 | Roberts et al. |
| 9,067,182 B2 | 6/2015 | Nichols et al. |
| 9,103,193 B2 | 8/2015 | Coli et al. |
| 9,119,326 B2 | 8/2015 | McDonnell et al. |
| 9,121,257 B2 | 9/2015 | Coli et al. |
| 9,140,110 B2 | 9/2015 | Coli et al. |
| 9,160,168 B2 | 10/2015 | Chapel et al. |
| 9,260,253 B2 | 2/2016 | Naizer et al. |
| 9,322,239 B2 | 4/2016 | Angeles Boza et al. |
| 9,324,049 B2 | 4/2016 | Thomeer et al. |
| 9,340,353 B2 | 5/2016 | Oren et al. |
| 9,366,114 B2 | 6/2016 | Coli et al. |
| 9,410,410 B2 | 8/2016 | Broussard et al. |
| 9,450,385 B2 | 9/2016 | Kristensen |
| 9,475,020 B2 | 10/2016 | Coli et al. |
| 9,475,021 B2 | 10/2016 | Coli et al. |
| 9,475,840 B2 | 10/2016 | Lledóet al. |
| 9,482,086 B2 | 11/2016 | Richardson et al. |
| 9,499,335 B2 | 11/2016 | McIver et al. |
| 9,506,333 B2 | 11/2016 | Castillo et al. |
| 9,513,055 B1 | 12/2016 | Seal |
| 9,534,473 B2 | 1/2017 | Morris et al. |
| 9,562,420 B2 | 2/2017 | Morris et al. |
| 9,587,649 B2 | 3/2017 | Oehring |
| 9,611,728 B2 | 4/2017 | Oehring |
| 9,650,871 B2 | 5/2017 | Oehring et al. |
| 9,650,879 B2 | 5/2017 | Broussard et al. |
| 9,706,185 B2 | 7/2017 | Ellis |
| 9,728,354 B2 | 8/2017 | Skolozdra et al. |
| 9,738,461 B2 | 8/2017 | DeGaray et al. |
| 9,739,546 B2 | 8/2017 | Bertilsson et al. |
| 9,745,840 B2 | 8/2017 | Oehring et al. |
| 9,840,901 B2 | 12/2017 | Oehring et al. |
| 9,863,228 B2 | 1/2018 | Shampine et al. |
| 9,893,500 B2 | 2/2018 | Oehring et al. |
| 9,903,190 B2 | 2/2018 | Conrad et al. |
| 9,909,398 B2 | 3/2018 | Pham |
| 9,915,128 B2 | 3/2018 | Hunter |
| 9,932,799 B2 | 4/2018 | Symchuk |
| 9,963,961 B2 | 5/2018 | Hardin |
| 9,970,278 B2 | 5/2018 | Broussard et al. |
| 9,976,351 B2 | 5/2018 | Randall |
| 9,995,218 B2 | 6/2018 | Oehring et al. |
| 10,008,880 B2 | 6/2018 | Vicknair et al. |
| 10,020,711 B2 | 7/2018 | Oehring et al. |
| 10,036,238 B2 | 7/2018 | Oehring |
| 10,107,086 B2 | 10/2018 | Oehring |
| 10,119,381 B2 | 11/2018 | Oehring et al. |
| 10,184,465 B2 | 1/2019 | Enis et al. |
| 10,196,878 B2 | 2/2019 | Hunter |
| 10,221,639 B2 | 3/2019 | Romer et al. |
| 10,227,854 B2 | 3/2019 | Glass |
| 10,232,332 B2 | 3/2019 | Oehring et al. |
| 10,246,984 B2 | 4/2019 | Payne et al. |
| 10,254,732 B2 | 4/2019 | Oehring et al. |
| 10,260,327 B2 | 4/2019 | Kajaria et al. |
| 10,280,724 B2 | 5/2019 | Hinderliter |
| 10,287,873 B2 | 5/2019 | Filas et al. |
| 10,302,079 B2 | 5/2019 | Kendrick |
| 10,309,205 B2 | 6/2019 | Randall |
| 10,337,308 B2 | 7/2019 | Broussard et al. |
| 10,371,012 B2 | 8/2019 | Davis et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,030 B2 | 9/2019 | Oehring et al. |
| 10,408,031 B2 | 9/2019 | Oehring et al. |
| 10,415,332 B2 | 9/2019 | Morris et al. |
| 10,436,026 B2 | 10/2019 | Ounadjela et al. |
| 10,526,882 B2 | 1/2020 | Oehring et al. |
| 10,627,003 B2 | 4/2020 | Dale et al. |
| 10,648,311 B2 | 5/2020 | Oehring et al. |
| 10,669,471 B2 | 6/2020 | Schmidt et al. |
| 10,669,804 B2 | 6/2020 | Kotrla et al. |
| 10,690,131 B2 | 6/2020 | Rashid et al. |
| 10,695,950 B2 | 6/2020 | Igo et al. |
| 10,711,576 B2 | 7/2020 | Bishop |
| 10,740,730 B2 | 8/2020 | Altamirano et al. |
| 10,794,165 B2 | 10/2020 | Fischer et al. |
| 10,934,824 B2 | 3/2021 | Oehring et al. |
| 2001/0000996 A1 | 5/2001 | Grimland et al. |
| 2002/0169523 A1* | 11/2002 | Ross ............... H02J 3/381 |
| | | 700/286 |
| 2003/0079875 A1 | 1/2003 | Weng |
| 2003/0056514 A1 | 3/2003 | Lohn |
| 2003/0057704 A1 | 3/2003 | Baten et al. |
| 2003/0138327 A1 | 7/2003 | Jones et al. |
| 2004/0040746 A1 | 3/2004 | Niedermayr et al. |
| 2004/0102109 A1* | 5/2004 | Cratty ............... B63H 21/17 |
| | | 440/113 |
| 2004/0167738 A1 | 8/2004 | Miller |
| 2004/0212679 A1 | 10/2004 | Jun |
| 2005/0061548 A1 | 3/2005 | Hooper et al. |
| 2005/0116541 A1 | 6/2005 | Seiver |
| 2005/0201197 A1 | 9/2005 | Duell et al. |
| 2005/0274508 A1 | 12/2005 | Folk et al. |
| 2006/0052903 A1 | 3/2006 | Bassett |
| 2006/0065319 A1 | 3/2006 | Csitari |
| 2006/0109141 A1 | 5/2006 | Huang et al. |
| 2007/0125544 A1 | 6/2007 | Robinson et al. |
| 2007/0131410 A1 | 6/2007 | Hill et al. |
| 2007/0187163 A1 | 8/2007 | Cone et al. |
| 2007/0201305 A1 | 8/2007 | Heilman et al. |

(56) References Cited

U.S. PATENT DOCUMENTS

| | | |
|---|---|---|
| 2007/0226089 A1 | 9/2007 | DeGaray et al. |
| 2007/0277982 A1 | 12/2007 | Shampine et al. |
| 2007/0278140 A1 | 12/2007 | Mallet et al. |
| 2008/0017369 A1 | 1/2008 | Sarada |
| 2008/0041596 A1 | 2/2008 | Blount et al. |
| 2008/0095644 A1 | 4/2008 | Mantei et al. |
| 2008/0112802 A1 | 5/2008 | Orlando et al. |
| 2008/0137266 A1 | 6/2008 | Jensen et al. |
| 2008/0142304 A1 | 6/2008 | Schutz et al. |
| 2008/0164023 A1 | 7/2008 | Dykstra et al. |
| 2008/0208478 A1 | 8/2008 | Ella et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0264625 A1 | 10/2008 | Ochoa |
| 2008/0264649 A1 | 10/2008 | Crawford |
| 2008/0277120 A1 | 11/2008 | Hickie |
| 2009/0045782 A1 | 2/2009 | Datta et al. |
| 2009/0065299 A1 | 3/2009 | Vito et al. |
| 2009/0068031 A1 | 3/2009 | Gambier et al. |
| 2009/0072645 A1 | 3/2009 | Quere |
| 2009/0078410 A1 | 3/2009 | Krenek et al. |
| 2009/0093317 A1 | 4/2009 | Kajiwara et al. |
| 2009/0095482 A1 | 4/2009 | Surjaatmadja |
| 2009/0114392 A1 | 5/2009 | Tolman et al. |
| 2009/0122578 A1 | 5/2009 | Beltran |
| 2009/0145611 A1 | 6/2009 | Pallini, Jr. et al. |
| 2009/0153354 A1 | 6/2009 | Daussin et al. |
| 2009/0188181 A1 | 7/2009 | Forbis et al. |
| 2009/0200035 A1 | 8/2009 | Bjerkreim et al. |
| 2009/0200290 A1 | 8/2009 | Cardinal et al. |
| 2009/0260826 A1 | 10/2009 | Sherwood et al. |
| 2009/0308602 A1 | 12/2009 | Bruins et al. |
| 2009/0315297 A1 | 12/2009 | Nadeau et al. |
| 2010/0000508 A1 | 1/2010 | Chandler |
| 2010/0019574 A1* | 1/2010 | Baldassarre ............... H02J 9/06 |
| | | 307/64 |
| 2010/0038907 A1 | 2/2010 | Hunt et al. |
| 2010/0045109 A1 | 2/2010 | Arnold |
| 2010/0051272 A1 | 3/2010 | Loree et al. |
| 2010/0132949 A1 | 6/2010 | DeFosse et al. |
| 2010/0146981 A1 | 6/2010 | Motakef et al. |
| 2010/0148588 A1* | 6/2010 | Algrain ..................... H02P 9/04 |
| | | 322/29 |
| 2010/0172202 A1 | 7/2010 | Borgstadt |
| 2010/0193057 A1 | 8/2010 | Garner et al. |
| 2010/0250139 A1 | 9/2010 | Hobbs et al. |
| 2010/0281876 A1 | 11/2010 | Khan et al. |
| 2010/0293973 A1 | 11/2010 | Erickson |
| 2010/0303655 A1 | 12/2010 | Scekic |
| 2010/0322802 A1 | 12/2010 | Kugelev |
| 2011/0005757 A1 | 1/2011 | Hebert |
| 2011/0017468 A1 | 1/2011 | Birch et al. |
| 2011/0042387 A1 | 2/2011 | Henry et al. |
| 2011/0052423 A1 | 3/2011 | Gambier et al. |
| 2011/0061855 A1 | 3/2011 | Case et al. |
| 2011/0063942 A1 | 3/2011 | Hagan et al. |
| 2011/0081268 A1 | 4/2011 | Ochoa et al. |
| 2011/0085924 A1 | 4/2011 | Shampine et al. |
| 2011/0097988 A1 | 4/2011 | Lord |
| 2011/0110793 A1 | 5/2011 | Leugemores et al. |
| 2011/0166046 A1 | 7/2011 | Weaver et al. |
| 2011/0175397 A1 | 7/2011 | Amrine, Jr. et al. |
| 2011/0197988 A1 | 8/2011 | Van Vliet et al. |
| 2011/0241590 A1 | 10/2011 | Horikoshi et al. |
| 2011/0247878 A1 | 10/2011 | Rasheed |
| 2011/0272158 A1 | 11/2011 | Neal |
| 2012/0018016 A1 | 1/2012 | Gibson et al. |
| 2012/0029716 A1* | 2/2012 | Sekoguchi ............... H02J 3/38 |
| | | 700/297 |
| 2012/0049625 A1 | 3/2012 | Hopwood |
| 2012/0063936 A1 | 3/2012 | Baxter et al. |
| 2012/0085541 A1 | 4/2012 | Love et al. |
| 2012/0111560 A1 | 5/2012 | Hill et al. |
| 2012/0112757 A1 | 5/2012 | Vrankovic et al. |
| 2012/0127635 A1 | 5/2012 | Grindeland |
| 2012/0150455 A1 | 6/2012 | Franklin et al. |
| 2012/0152716 A1 | 6/2012 | Kikukawa et al. |
| 2012/0205301 A1 | 8/2012 | McGuire et al. |
| 2012/0205400 A1 | 8/2012 | DeGaray et al. |
| 2012/0217067 A1 | 8/2012 | Mebane, III et al. |
| 2012/0222865 A1 | 9/2012 | Larson et al. |
| 2012/0232728 A1* | 9/2012 | Karimi ..................... H02J 3/38 |
| | | 180/65.265 |
| 2012/0247783 A1 | 10/2012 | Berner, Jr. et al. |
| 2012/0255734 A1 | 10/2012 | Coli et al. |
| 2013/0009469 A1* | 1/2013 | Gillett ..................... H02J 3/381 |
| | | 307/25 |
| 2013/0025706 A1 | 1/2013 | DeGaray et al. |
| 2013/0051971 A1 | 2/2013 | Wyse et al. |
| 2013/0078114 A1 | 3/2013 | Van Rijswick et al. |
| 2013/0138254 A1 | 5/2013 | Seals et al. |
| 2013/0175038 A1 | 7/2013 | Conrad |
| 2013/0175039 A1 | 7/2013 | Guidry |
| 2013/0180722 A1 | 7/2013 | Caro et al. |
| 2013/0189629 A1 | 7/2013 | Chandler |
| 2013/0199617 A1 | 8/2013 | DeGaray et al. |
| 2013/0233542 A1 | 9/2013 | Shampine et al. |
| 2013/0255271 A1 | 10/2013 | Yu et al. |
| 2013/0284455 A1 | 10/2013 | Kajaria et al. |
| 2013/0299167 A1 | 11/2013 | Fordyce et al. |
| 2013/0306322 A1 | 11/2013 | Sanborn et al. |
| 2013/0317750 A1 | 11/2013 | Hunter |
| 2013/0341029 A1 | 12/2013 | Roberts et al. |
| 2013/0343858 A1 | 12/2013 | Flusche |
| 2014/0000899 A1 | 1/2014 | Nevison |
| 2014/0010671 A1 | 1/2014 | Cryer et al. |
| 2014/0048255 A1 | 2/2014 | Baca et al. |
| 2014/0054965 A1* | 2/2014 | Jain ......................... H02J 9/062 |
| | | 307/65 |
| 2014/0060658 A1 | 3/2014 | Hains et al. |
| 2014/0077607 A1 | 3/2014 | Clarke et al. |
| 2014/0095114 A1 | 4/2014 | Thomeer et al. |
| 2014/0096974 A1* | 4/2014 | Coli ....................... B01F 35/3204 |
| | | 166/308.1 |
| 2014/0124162 A1 | 5/2014 | Leavitt |
| 2014/0138079 A1 | 5/2014 | Broussard et al. |
| 2014/0158345 A1 | 6/2014 | Jang et al. |
| 2014/0174717 A1 | 6/2014 | Broussard et al. |
| 2014/0219824 A1 | 8/2014 | Burnette |
| 2014/0238683 A1 | 8/2014 | Korach et al. |
| 2014/0246211 A1 | 9/2014 | Guidry et al. |
| 2014/0251623 A1 | 9/2014 | Lestz et al. |
| 2014/0255214 A1 | 9/2014 | Burnette |
| 2014/0273128 A1 | 9/2014 | Coleman et al. |
| 2014/0277772 A1 | 9/2014 | Lopez et al. |
| 2014/0290768 A1 | 10/2014 | Rendle et al. |
| 2014/0379300 A1 | 12/2014 | Devine et al. |
| 2015/0027712 A1 | 1/2015 | Vicknair et al. |
| 2015/0038021 A1 | 2/2015 | Gilliam |
| 2015/0053426 A1 | 2/2015 | Smith et al. |
| 2015/0068724 A1 | 3/2015 | Coli et al. |
| 2015/0068754 A1 | 3/2015 | Coli et al. |
| 2015/0075778 A1 | 3/2015 | Walters et al. |
| 2015/0083426 A1 | 3/2015 | Lesko et al. |
| 2015/0097504 A1 | 4/2015 | Lamascus et al. |
| 2015/0114652 A1 | 4/2015 | Lestz et al. |
| 2015/0136043 A1 | 5/2015 | Shaaban et al. |
| 2015/0144336 A1 | 5/2015 | Hardin et al. |
| 2015/0147194 A1 | 5/2015 | Foote |
| 2015/0159911 A1 | 6/2015 | Holt |
| 2015/0175013 A1 | 6/2015 | Cryer et al. |
| 2015/0176386 A1 | 6/2015 | Castillo et al. |
| 2015/0211512 A1 | 7/2015 | Wiegman et al. |
| 2015/0211524 A1 | 7/2015 | Broussard et al. |
| 2015/0217672 A1 | 8/2015 | Shampine et al. |
| 2015/0225113 A1 | 8/2015 | Lungu et al. |
| 2015/0233530 A1 | 8/2015 | Sandidge |
| 2015/0252661 A1* | 9/2015 | Glass ....................... E21B 43/2607 |
| | | 166/308.1 |
| 2015/0300145 A1 | 10/2015 | Coli et al. |
| 2015/0300336 A1 | 10/2015 | Hernandez et al. |
| 2015/0314225 A1 | 11/2015 | Coli et al. |
| 2015/0330172 A1 | 11/2015 | Allmaras et al. |

(56) References Cited

U.S. PATENT DOCUMENTS

| | | |
|---|---|---|
| 2015/0354322 A1 | 12/2015 | Vicknair |
| 2016/0006311 A1 | 1/2016 | Li |
| 2016/0032703 A1 | 2/2016 | Broussard et al. |
| 2016/0102537 A1 | 4/2016 | Lopez |
| 2016/0105022 A1* | 4/2016 | Oehring .................... H02J 3/14 307/29 |
| 2016/0208592 A1 | 4/2016 | Oehring |
| 2016/0160889 A1 | 6/2016 | Hoffman et al. |
| 2016/0177675 A1 | 6/2016 | Morris et al. |
| 2016/0177678 A1 | 6/2016 | Morris et al. |
| 2016/0186531 A1 | 6/2016 | Harkless et al. |
| 2016/0208593 A1 | 7/2016 | Coli et al. |
| 2016/0208594 A1 | 7/2016 | Coli et al. |
| 2016/0208595 A1 | 7/2016 | Tang et al. |
| 2016/0221220 A1 | 8/2016 | Paige |
| 2016/0230524 A1 | 8/2016 | Dumoit et al. |
| 2016/0230525 A1 | 8/2016 | Lestz et al. |
| 2016/0230660 A1 | 8/2016 | Zeitoun et al. |
| 2016/0258267 A1 | 9/2016 | Payne et al. |
| 2016/0265457 A1 | 9/2016 | Stephenson et al. |
| 2016/0273328 A1 | 9/2016 | Oehring |
| 2016/0273456 A1 | 9/2016 | Zhang et al. |
| 2016/0281484 A1 | 9/2016 | Lestz et al. |
| 2016/0290114 A1 | 10/2016 | Oehring et al. |
| 2016/0312108 A1 | 10/2016 | Diggns |
| 2016/0319649 A1 | 11/2016 | Oehring |
| 2016/0319650 A1 | 11/2016 | Oehring et al. |
| 2016/0326853 A1 | 11/2016 | Fredd et al. |
| 2016/0326854 A1 | 11/2016 | Broussard et al. |
| 2016/0326855 A1 | 11/2016 | Coli et al. |
| 2016/0341281 A1 | 11/2016 | Brunvold et al. |
| 2016/0348479 A1 | 12/2016 | Oehring et al. |
| 2016/0349728 A1 | 12/2016 | Oehring et al. |
| 2016/0369609 A1 | 12/2016 | Morris et al. |
| 2017/0016433 A1 | 1/2017 | Chong et al. |
| 2017/0021318 A1 | 1/2017 | McIver et al. |
| 2017/0022788 A1 | 1/2017 | Oehring et al. |
| 2017/0022807 A1 | 1/2017 | Dursun et al. |
| 2017/0028368 A1 | 2/2017 | Oehring et al. |
| 2017/0030177 A1 | 2/2017 | Oehring et al. |
| 2017/0036178 A1 | 2/2017 | Coli et al. |
| 2017/0036872 A1 | 2/2017 | Wallace et al. |
| 2017/0037717 A1 | 2/2017 | Oehring et al. |
| 2017/0037718 A1 | 2/2017 | Coli et al. |
| 2017/0043280 A1 | 2/2017 | Vankouwenberg |
| 2017/0051692 A1* | 2/2017 | Zhang .................... F02D 29/06 |
| 2017/0051732 A1 | 2/2017 | Hemandez et al. |
| 2017/0074076 A1 | 3/2017 | Joseph et al. |
| 2017/0082033 A1 | 3/2017 | Wu et al. |
| 2017/0096885 A1 | 4/2017 | Oehring et al. |
| 2017/0096889 A1 | 4/2017 | Blanckaert et al. |
| 2017/0104389 A1 | 4/2017 | Morris et al. |
| 2017/0114625 A1 | 4/2017 | Norris et al. |
| 2017/0130743 A1 | 5/2017 | Anderson |
| 2017/0138171 A1 | 5/2017 | Richards et al. |
| 2017/0145918 A1 | 5/2017 | Oehring et al. |
| 2017/0146189 A1 | 5/2017 | Herman et al. |
| 2017/0159570 A1 | 6/2017 | Bickert |
| 2017/0159654 A1 | 6/2017 | Kendrick |
| 2017/0175516 A1 | 6/2017 | Eslinger |
| 2017/0204852 A1 | 7/2017 | Barnett, Jr. |
| 2017/0212535 A1 | 7/2017 | Shelman et al. |
| 2017/0218727 A1 | 8/2017 | Oehring et al. |
| 2017/0218843 A1 | 8/2017 | Oehring et al. |
| 2017/0222409 A1 | 8/2017 | Oehring et al. |
| 2017/0226838 A1 | 8/2017 | Ciezobka et al. |
| 2017/0226839 A1 | 8/2017 | Broussard et al. |
| 2017/0226842 A1 | 8/2017 | Omont et al. |
| 2017/0234250 A1 | 8/2017 | Janik et al. |
| 2017/0241221 A1 | 8/2017 | Seshadri et al. |
| 2017/0259227 A1 | 9/2017 | Morris et al. |
| 2017/0292513 A1 | 10/2017 | Haddad et al. |
| 2017/0313499 A1 | 11/2017 | Hughes et al. |
| 2017/0314380 A1 | 11/2017 | Oehring et al. |
| 2017/0314979 A1 | 11/2017 | Ye et al. |
| 2017/0328179 A1 | 11/2017 | Dykstra et al. |
| 2017/0369258 A1 | 12/2017 | DeGaray et al. |
| 2017/0370639 A1 | 12/2017 | Bardon et al. |
| 2018/0028992 A1 | 2/2018 | Stegemoeller et al. |
| 2018/0038216 A1 | 2/2018 | Zhang et al. |
| 2018/0045331 A1 | 2/2018 | Lopez et al. |
| 2018/0090914 A1 | 3/2018 | Johnson et al. |
| 2018/0156210 A1 | 6/2018 | Oehring et al. |
| 2018/0181830 A1 | 6/2018 | Luharuka et al. |
| 2018/0183219 A1 | 6/2018 | Oehring et al. |
| 2018/0216455 A1 | 8/2018 | Andreychuk et al. |
| 2018/0238147 A1 | 8/2018 | Shahri et al. |
| 2018/0245428 A1 | 8/2018 | Richards |
| 2018/0258746 A1* | 9/2018 | Broussard .............. E21B 43/26 |
| 2018/0259080 A1 | 9/2018 | Dale et al. |
| 2018/0266217 A1 | 9/2018 | Funkhauser et al. |
| 2018/0266412 A1 | 9/2018 | Stokkevag et al. |
| 2018/0274446 A1 | 9/2018 | Oehring et al. |
| 2018/0284817 A1 | 10/2018 | Cook et al. |
| 2018/0291713 A1 | 10/2018 | Jeanson |
| 2018/0298731 A1 | 10/2018 | Bishop |
| 2018/0312738 A1 | 11/2018 | Rutsch et al. |
| 2018/0313677 A1 | 11/2018 | Warren et al. |
| 2018/0320483 A1 | 11/2018 | Zhang et al. |
| 2018/0343125 A1 | 11/2018 | Clish et al. |
| 2018/0363437 A1 | 12/2018 | Coli et al. |
| 2018/0363640 A1 | 12/2018 | Kajita et al. |
| 2018/0366950 A1 | 12/2018 | Pedersen et al. |
| 2019/0003329 A1 | 1/2019 | Morris et al. |
| 2019/0010793 A1 | 1/2019 | Hinderliter |
| 2019/0011066 A1 | 1/2019 | Ungchusri et al. |
| 2019/0040727 A1 | 2/2019 | Oehring et al. |
| 2019/0063309 A1* | 2/2019 | Davis .................... H02K 7/116 |
| 2019/0100989 A1 | 4/2019 | Stewart et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0128080 A1 | 5/2019 | Ross et al. |
| 2019/0128104 A1 | 5/2019 | Graham et al. |
| 2019/0145251 A1 | 5/2019 | Johnson |
| 2019/0154020 A1 | 5/2019 | Glass |
| 2019/0162061 A1 | 5/2019 | Stephenson |
| 2019/0169971 A1 | 6/2019 | Oehring et al. |
| 2019/0178057 A1 | 6/2019 | Hunter |
| 2019/0178235 A1 | 6/2019 | Coskrey et al. |
| 2019/0203567 A1 | 7/2019 | Ross et al. |
| 2019/0203572 A1 | 7/2019 | Morris et al. |
| 2019/0211661 A1 | 7/2019 | Reckels et al. |
| 2019/0245348 A1 | 8/2019 | Hinderliter et al. |
| 2019/0249527 A1 | 8/2019 | Kraynek |
| 2019/0257462 A1 | 8/2019 | Rogers |
| 2019/0292866 A1 | 9/2019 | Ross et al. |
| 2019/0292891 A1 | 9/2019 | Kajaria et al. |
| 2019/0226317 A1 | 10/2019 | Payne et al. |
| 2019/0316447 A1 | 10/2019 | Oehring et al. |
| 2019/0383123 A1 | 12/2019 | Hinderliter |
| 2020/0040878 A1 | 2/2020 | Morris |
| 2020/0047141 A1 | 2/2020 | Oehring et al. |
| 2020/0088152 A1 | 3/2020 | Allion et al. |
| 2020/0232454 A1 | 7/2020 | Chretien et al. |
| 2020/0325760 A1 | 10/2020 | Markham |
| 2020/0350790 A1 | 11/2020 | Luft et al. |
| 2021/0032961 A1 | 2/2021 | Hinderliter et al. |
| 2021/0131248 A1 | 5/2021 | Hinderliter et al. |

FOREIGN PATENT DOCUMENTS

| | | |
|---|---|---|
| CA | 2707269 A1 | 12/2010 |
| CA | 2797081 A1 | 11/2011 |
| CA | 3050131 A1 | 11/2011 |
| CA | 2955706 A1 | 10/2012 |
| CA | 2966672 A1 | 10/2012 |
| CA | 2849825 A1 | 4/2013 |
| CA | 3000322 A1 | 4/2013 |
| CA | 2787814 A1 | 2/2014 |
| CA | 2833711 A1 | 5/2014 |
| CA | 2919649 A1 | 8/2016 |
| CA | 2919666 A1 | 8/2016 |
| CA | 2978706 A1 | 9/2016 |

(56) References Cited

FOREIGN PATENT DOCUMENTS

| | | |
|---|---|---|
| CA | 2944980 A1 | 4/2017 |
| CA | 2945579 A1 | 4/2017 |
| CA | 3006422 A1 | 6/2017 |
| CA | 3018485 A1 | 8/2017 |
| CA | 2964593 A1 | 10/2017 |
| CA | 3067854 A1 | 1/2019 |
| CN | 101977016 A | 2/2011 |
| CN | 104117308 A | 10/2014 |
| CN | 104196613 A | 12/2014 |
| CN | 205986303 U | 2/2017 |
| CN | 112196508 A | 1/2021 |
| JP | 2004264589 A | 9/2004 |
| WO | 0047893 A1 | 8/2000 |
| WO | 2007055587 A1 | 5/2007 |
| WO | 2012051705 A1 | 4/2012 |
| WO | 201411676 A1 | 7/2014 |
| WO | 2014105642 A1 | 7/2014 |
| WO | 2014177346 A1 | 11/2014 |
| WO | 2016144939 A1 | 9/2016 |
| WO | 2016160458 A1 | 10/2016 |
| WO | 2018044307 A1 | 3/2018 |
| WO | 2018213925 A1 | 11/2018 |

OTHER PUBLICATIONS

Davis, "Natural Gas Finding Niche in E-Fracking, But Diesel Still Rules," Natural Gas Intelligence, NGI, 2019, 9 pages.
International Search Report and Written Opinion issued in PCT Application No. PCT/US2020/023912, dated Jun. 23, 2020.
Non-Final Office Action issued in corresponding U.S. Appl. No. 14/622,532, dated May 17, 2016.
Non-Final Office Action issued in corresponding U.S. Appl. No. 14/881,535, dated May 20, 2020.
Non-Final Office Action issued in corresponding U.S. Appl. No. 14/881,535, dated Oct. 6, 2017.
Non-Final Office Action issued in U.S. Appl. No. 16/564,186, mailed Oct. 15, 2021.
Non-Final Office Action issued in corresponding U.S. Appl. No. 15/145,414, dated Nov. 29, 2017.
Non-Final Office Action issued in corresponding U.S. Appl. No. 15/145,491, dated May 15, 2017.
Non-Final Office Action issued in corresponding U.S. Appl. No. 15/145,491, dated Sep. 12, 2016.
Non-Final Office Action issued in corresponding U.S. Appl. No. 15/183,387, dated Apr. 2, 2018.
Canadian Office Action issued in Canadian Application No. 2,964,597, dated Jun. 20, 2019.
Non-Final Office Action issued in corresponding U.S. Appl. No. 15/217,040, dated Nov. 29, 2016.
Non-Final Office Action issued in corresponding U.S. Appl. No. 15/217,081, dated Oct. 4, 2018.
Non-Final Office Action issued in corresponding U.S. Appl. No. 15/235,716, dated May 29, 2018.
International Search Report and Written Opinion issued in PCT Application No. PCT/US2020/000017, dated Jul. 22, 2020.
Non-Final Office Action issued in corresponding U.S. Appl. No. 15/291,842, dated Jan. 6, 2017.
Non-Final Office Action issued in corresponding U.S. Appl. No. 15/293,681, dated Feb. 16, 2017.
Non-Final Office Action issued in corresponding U.S. Appl. No. 15/294,349, dated Apr. 10, 2018.
Canadian Office Action issued in Canadian Application No. 2,936,997, dated Oct. 1, 2019.
Canadian Office Action issued in Canadian Application No. 2,943,275, dated Mar. 1, 2019.
Canadian Office Action issued in Canadian Application No. 2,944,968, dated Aug. 17, 2020.
Canadian Office Action issued in Canadian Application No. 2,945,281, dated Sep. 28, 2018.
Non-Final Office Action issued in corresponding U.S. Appl. No. 16/943,727, dated Sep. 29, 2020.
Notice of Allowance issued in corresponding U.S. Appl. No. 16/443,273, dated Aug. 19, 2021.
Notice of Allowance issued in corresponding U.S. Appl. No. 17/540,807, dated Jmarch 15, 2023.
Final Office Action issued in corresponding U.S. Appl. No. 16/443,273, dated Apr. 2, 2020.
Final Office Action issued in corresponding U.S. Appl. No. 16/443,273, dated Apr. 2, 2021.
Fink, "Standard Handbook for Electrical Engineers," Thirteenth Edition, McGraw-Hill, ISBN: 0-07-020984-7, 7 pages (excerpts) (Part 2).
Fink, "Standard Handbook for Electrical Engineers," Thirteenth Edition, McGraw-Hill, ISBN: 0-07-020984-7, 6 pages (excerpts) (Part 3).
Roe, "Practices and Procedures of Industrial Electrical Design," McGraw-Hill, 1972, ISBN: 0-07-053390-3, 14 pages (Part 1).
Roe, "Practices and Procedures of Industrial Electrical Design," McGraw-Hill, 1972, ISBN: 0-07-053390-3, 11 pages (Part 2).
Camara, "Electrical Engineering Reference Manual for the Electrical and Computer PE Exam—Sixth Edition," Professional Publications, Inc., ISBN: 1-888577-56-8, 2002, 17 pages (Part 1).
Camara, "Electrical Engineering Reference Manual for the Electrical and Computer PE Exam—Sixth Edition," Professional Publications, Inc., ISBN: 1-888577-56-8, 2002, 25 pages (Part 2).
Camara, "Electrical Engineering Reference Manual for the Electrical and Computer PE Exam—Sixth Edition," Professional Publications, Inc., ISBN: 1-888577-56-8, 2002, 20 pages (Part 3).
Camara, "Electrical Engineering Reference Manual for the Electrical and Computer PE Exam—Sixth Edition," Professional Publications, Inc., ISBN: 1-888577-56-8, 2002, 19 pages (Part 4).
Camara, "Electrical Engineering Reference Manual for the Electrical and Computer PE Exam—Sixth Edition," Professional Publications, Inc., ISBN: 1-888577-56-8, 2002, 21 pages (Part 5).
PPI Course Catalog, 2004, available at: https://web.archive.org/web/20040220012405/http://ppi2pass.com/catalog/servlet/MyPpi_fl_corner-catalog.pdf, 16 pages.
"Teaching an Electrical and Computer Engineering PE Exam Review Course," PPI, 2003, available at: https://web.archive.org/web/20031223100101/http://ppi2pass.com/catalog/servlet/MyPpi_pg_corner-teachee.html, 2 pages.
"Instructors Corner," PPI, 2003, available at: https://web.archive.org/web/20031219232547/http://ppi2pass.com/catalog/servlet/MyPpi_pg_corner-corner.html, 2 pages.
EE-Reference Online Index, 2004, available at: https://web.archive.org/web/20040731020344/http://ppi2pass.com/catalog/servlet/MyPpi_fl_indices-EERMindex.pdf, 41 pages.
EE-Reference Online Introduction, 2004, available at: https://web.archive.org/web/20041013101643/http://ppi2pass.com/catalog/servlet/MyPpi_fl_indices-EERMIntro.pdf, 12 pages.
"Electrical PE Exam Review Products," PPI Online Catalog, 2004, available at: https://web.archive.org/web/20040214233851/http://ppi2pass.com/catalog/servlet/MyPpi_ct_ELECTRICAL, 7 pages.
"The PPI Online Catalog," 2004, available at: https://web.archive.org/web/20040215142016/http://ppi2pass.com/catalog/servlet/MyPpi_ct_MAIN, 2 pages.
Homepage of Professional Publications, Inc., 2004, available at: https://web.archive.org/web/20040209054901/http:/ppi2pass.com/catalog/servlet/MyPpi, 1 page.
"What PPI Customers Say," 2003), available at: https://web.archive.org/web/20031226130924/http://ppi2pass.com/catalog/servlet/MyPpi_pg_comments-EEcomments.html, 2 pages.
"About PPI," 2003, available at: https://web.archive.org/web/20031219231426/http://ppi2pass.com:80/catalog/servlet/MyPpi_pg_aboutppi.html, 1 page.
Amazon.com listing of EE-Reference, 2007, available at: https://web.archive.org/web/20070103124447/https://www.amazon.com/Electrical-Engineering-Reference-Manual-Computer/dp/1888577568/, 7 pages.
Hampton, "Low-cost fracking offers boon to oil producers, headaches for suppliers," Reuters, Sep. 12, 2019, https://www.reuters.

(56) References Cited

OTHER PUBLICATIONS com/article/us-usa-oil-electric-fracturing-focus/low-cost-fracking-offers-boon-to-oil-producers-headaches-for-supplies, 11 page.
"All Electric Fracturing—Reducing Emissions and Cost," 2021, H013770, 6 pages.
Abbott et al., "Crippling the Innovation Economy: Regulatory Overreach at the Patent Office," Regulatory Transparency Project of the Federalist Society, Aug. 14, 2017, 35 pages.
"Hydraulic Fracturing Techbook," Hartenergy, 2015, 9 pages.
"Petroleum Alumnus and Team Development Mobile Fracturing Unit that Alleviates Environmental Impact," LSU College of Engineering, 2021, 2 pages.
"Clean Fleet Reduces Emissions by 99% at Hydraulic Fracturing Sites," FluidPower Journal, 2019, 5 pages.
Deuster, "Game-changing hydraulic fracturing technology, reduces emissions by 99%," Intrado GlobeNewswire, Oct. 1, 2014, 4 pages.
"Halliburton Delivers Successful Grid-Powered Frac Operation", Halliburton News Release, Jan. 14, 2021, 4 pages.
Wang et al., "Development In The Limited-Entry Completion Fracturing Technique," SPE 17834, 1988, 13 pages.
Holden III et al., "Successful Stimulation of Fordoche Field With a Retarded HF Acid," Society of Petroleum Engineers of AIME, Aug. 1981, 6 pages.
Milligan, "Sour Gas Well Completion Practices in the Foothills," Society of Petroleum Engineers of AIME, Sep. 1982, 12 pages.
Beck et al., "Reservoir Evaluation Of Fractured Cretaceous Carbonates In South Texas," SPWLA Eighteenth Annual Logging Symposium, Jun. 5-8, 1977, 25 pages.
Webster, "Current Completion Practices in Tight Reservoirs," Society of Petroleum Engineers, SPE 6379, 1977, 8 pages.
Bielstein, "Wire-Line Methods and Equipment," Humble Oil and Refining Company, Apr. 2, 1967, 16 pages.
"Form-wound Squirrel-Cage Induction Motors—500 Horsepower and Larger," ANSI/API Standard, 541-2003, Fourth Edition, Jun. 2004, 88 pages.
Gardner Denver, "Well Servicing Pump, Model GD-2500Q, Quintuplex, Operating and Service Manual," 300FWF996 Revision C, Aug. 2005, 46 pages.
"Standard Specification for Steel Bars, Carbon and Alloy, Hot-Wrought, General Requirements for," ASTM Int;l, A 29/A 29M-05, 2005, 16 pages.
"Variable Speed Pumping: A Guide to Successful Applications," Elsevier 2004, ISBN 1-85617-449-2, 2004, 186 pages.
Bonnett et al., "Squirrel Cage Rotor Options for A.C. Induction Motors," IEEE, 2000, 14 pages.
Bonnett, "Root Cause Failure Analysis for AC Induction Motors in the Petroleum and Chemical Industry," IEEE, Paper No. PCIC-2010-43, 2010, 13 pages.
"Mark's Standard Handbook for Mechanical Engineers, 11th Edition," McGraw-Hill, ISBN 0-07-142867-4, 2006, 11 pages.
"Standard Handbook for Electrical Engineers," Thirteenth Edition, McGraw-Hill, ISBN 0-07-020984-7, 1993, 9 pages (Part 1).
"Standard Handbook for Electrical Engineers," Thirteenth Edition, McGraw-Hill, ISBN 0-07-020984-7, 1993, 7 pages (Part 2).
"Standard Handbook for Electrical Engineers," Thirteenth Edition, McGraw-Hill, ISBN 0-07-020984-7, 1993, 6 pages (Part 3).
"112 IEEE Standard Test Procedure for Polyphase Induction Motors and Generators," IEEE Power Engineering Society, IEEE Std 112, 2004, 42 pages (Part 1).
"112 IEEE Standard Test Procedure for Polyphase Induction Motors and Generators," IEEE Power Engineering Society, IEEE Std 112, 2004, 45 pages (Part 2).
Hodowanec et al., "Introduction to API Standard 541, 4th Edition—Form-Wound Squirrel Cage Induction Motors—Larger than 500 Horsepower," IEEE, Paper No. PCIC-2003-33, 2003, 9 pages.
Rahill et al., "Sorting Out the Overlap," IEEE Industry Applications Magazine, vol. 15, No. 1, Jan.-Feb. 2009, 12 pages.
"Manufacturers of Cushioned Clamping, Quick Coupling & Support Systems," ZSI Beta Clamps, ZSI, Inc., Apr. 29, 2015, 2 pages.
Meikrantz et al., "Advances in Liquid/Liquid Centrifuge Design Provide New Options for Petroleum Production," Society of Petroleum Engineers, SPE 56709, 1999, 4 pages.
"Process Burner" (https://www.cebasrt.com/productsloii-gaslprocess-bumer) Sep. 6, 2018 (Sep. 6, 2018), entire document, especially para (Burners for refinery Heaters].
Notice of Allowance issued in corresponding U.S. Appl. No. 16/570,331, dated Jan. 9, 2020.
Notice of Allowance issued in corresponding U.S. Appl. No. 14/622,532, dated Mar. 27, 2017.
Non-Final Office Action issued in corresponding U.S. Appl. No. 15/356,436, dated Aug. 19, 2019.
Non-Final Office Action issued in corresponding U.S. Appl. No. 15/486,970, dated Jun. 22, 2017.
Non-Final Office Action issued in corresponding U.S. Appl. No. 15/487,656, dated Jun. 23, 2017.
Notice of Allowance issued in corresponding U.S. Appl. No. 15/217,040, dated Mar. 28, 2017.
Notice of Allowance issued in corresponding U.S. Appl. No. 15/635,028, dated Apr. 23, 2019.
International Search Report and Written Opinion issued in PCT Application No. PCT/US2018/063970, dated Mar. 5, 2019.
Non-Final Office Action issued in corresponding U.S. Appl. No. 15/487,694, dated Jun. 26, 2017.
Non-Final Office Action issued in corresponding U.S. Appl. No. 15/644,487, dated Jul. 25, 2018.
Non-Final Office Action issued in corresponding U.S. Appl. No. 15/644,487, dated Nov. 13, 2017.
Non-Final Office Action issued in corresponding U.S. Appl. No. 15/994,772, dated Sep. 3, 2019.
Non-Final Office Action issued in corresponding U.S. Appl. No. 16/152,695, dated Mar. 3, 2020.
Non-Final Office Action issued in corresponding U.S. Appl. No. 16/152,732, dated Oct. 2, 2019.
Non-Final Office Action issued in corresponding U.S. Appl. No. 16/160,708, dated Dec. 12, 2018.
UK Power Networks—Transformers to Supply Heat to Tate Modern—from Press Releases May 16, 2013.
Non-Final Office Action issued in corresponding U.S. Appl. No. 16/170,695, dated Feb. 12, 2019.
Non-Final Office Action issued in corresponding U.S. Appl. No. 16/170,695, dated Jun. 7, 2019.
Non-Final Office Action issued in corresponding U.S. Appl. No. 16/210,749, dated Feb. 25, 2019.
Non-Final Office Action issued in corresponding U.S. Appl. No. 16/268,030, dated Jun. 7, 2019.
Non-Final Office Action issued in corresponding U.S. Appl. No. 16/268,030, dated May 10, 2019.
Non-Final Office Action issued in corresponding U.S. Appl. No. 16/268,030, dated Sep. 11, 2019.
Non-Final Office Action issued in corresponding U.S. Appl. No. 16/385,070, dated Aug. 4, 2020.
Non-Final Office Action issued in corresponding U.S. Appl. No. 16/385,070, dated Oct. 11, 2019.
International Search Report and Written Opinion issued in PCT Application No. PCT/US2019/037493, dated Sep. 11, 2019.
Non-Final Office Action issued in corresponding U.S. Appl. No. 16/443,273, dated Sep. 20, 2019.
Non-Final Office Action issued in corresponding U.S. Appl. No. 16/564,186, dated Dec. 6, 2019.
Non-Final Office Action issued in corresponding U.S. Appl. No. 16/597,008, dated Dec. 23, 2019.
Final Office Action issued in corresponding U.S. Appl. No. 16/210,749, dated Jun. 11, 2019.
Final Office Action issued in corresponding U.S. Appl. No. 15/294,349, dated Jul. 6, 2017.
International Search Report and Written Opinion issued in PCT Application No. PCT/US2018/063977, dated Feb. 15, 2019.
Final Office Action issued in corresponding U.S. Appl. No. 15/145,491, dated Jan. 20, 2017.
Final Office Action issued in corresponding U.S. Appl. No. 14/622,532, dated Dec. 7, 2016.

(56) References Cited

OTHER PUBLICATIONS

Final Office Action issued in corresponding U.S. Appl. No. 14/622,532, dated Dec. 21, 2015.
Non-Final Office Action issued in corresponding U.S. Appl. No. 16/597,014, dated Jan. 10, 2020.
International Search Report and Written Opinion issued in PCT Application No. PCT/US2019/055325, dated Jan. 2, 2020.
International Search Report and Written Opinion issued in PCT Application No. PCT/US2019/055323, dated Feb. 11, 2020.
International Search Report and Written Opinion issued in PCT Application No. PCT/US2019/051018, dated Nov. 26, 2019.
Non-Final Office Action issued in corresponding U.S. Appl. No. 15/145,443, dated Feb. 7, 2017.
International Search Report and Written Opinion issued in PCT Application No. PCT/US2019/027584, dated Jul. 9, 2019.
International Search Report and Written Opinion issued in PCT Application No. PCT/US2019/016635, dated Apr. 10, 2019.
International Search Report and Written Opinion issued in PCT Application No. PCT/US2018/040683, dated Sep. 19, 2018.
International Search Report and Written Opinion issued in PCT Application No. PCT/US2018/054542, dated Jan. 2, 2019.
International Search Report and Written Opinion issued in PCT Application No. PCT/US2018/057539, dated January 4. 2019.
International Search Report and Written Opinion issued in PCT Application No. PCT/US2018/055913, dated Dec. 31, 2018.
Shafto, "Growth in electric-fracking fleets stunted by tight producer budgets," S&P Global Market Intelligence, Aug. 6, 2019, 4 pages.
"Swivel Joint," Jereh, Yantal Jereh Petroleum Equipment & Technologies Co. Ltd., printed Dec. 1, 2022, 14 pages.
Camara, "Electrical Engineering Reference Manual for the Electrical and Computer PE Exam—Sixth Edition," Professional Publications, Inc., ISBN: 1-888577-56-8, 2002, 50 pages.
"Comprehensive Power, Power It Up," Technical Presentation, Feb. 27, 2013 (available at: https://www.slideshare.net/jeffsable/comprehensive-power-introduction-oct2013?from_action=save), 28 pages.
"Comprehensive Power, Power It Up," Technical Presentation, Oct. 3, 2013 (available at: https://www.slideshare.net/jeffsable/comprehensive-power-introduction-oct2013?from_action=save), 26 pages.
"American National Standard—Motors and Generators," ANSI/NEMA MG 1, 2011, 636 pages.
"IEEE Standard for Petroleum and Chemical Industry—Premium-Efficiency, Severe-Duty, Totally Enclosed Fan-Cooled (TEFC) Squirrel Cage Induction Motors—Up to and Including 370 kW (500 hp)," IEEE, 2009, 32 pages.
Cary et al., "Electric Rotating Machine Standards Part II: Magnetic Wedge Design & Monitoring Methods," IEEE, Paper No. PCIC-2011-41, 2011, 8 pages.
Bogh et al., "A User's Guide to Factory Testing of Large Motors: What Should Your Witness Expect?," IEEE, Paper No. PCIC-, 2009, 8 pages.
Lockley et al., "What Do the API Motor/Generator Features Cost and What Do They Buy You?," IEEE, Paper No. PCIC-2010-22, 2010, 10 pages.
Malinowski et al., "Petrochemical standards a comparison between IEEE 841-2001, API 541 and API 547," IEEE, Paper No. PCIC-2004-22, 2004, 8 pages.
"Reinventing the Frac Fleet," Clean Fleet, WhisperFrac Reducing Noise and Vibrations, 2018, 2 pages.
"MEC's Mobile Electric Centers for Voltages up to 36kV," ABB, printed 2021, 2 pages.
"Prefabricated Electric Centers (PEC)—Mobile Electric Centers (MEC)," ABB, 2017, 14 pages.
"Mobile Substations on wheels," ABB, 2022, 4 pages.
"Benefits of Using Mobile Transformers and Mobile Substations for Rapidly Restoring Electrical Service," U.S. Department of Energy, Aug. 2006, 48 pages.
"The Evolution of the Modern Substation," Primera, 2022, 4 pages.

Hanna et al., "Medium-Voltage Adjustable-Speed Drives—Users' and Manufacturers' Experiences," IEEE Transactions on Industry Applications, vol. 33, No. 6, Nov./Dec. 1997, 9 pages.
"IEEE 100: The Authoritative Dictionary of IEEE Standards Terms, Seventh Edition," IEEE Press, 2000, ISBN: 0-7381-2601-2, 7 pages.
"Adjustable Speed Electrical Power Drive Systems—Part 4: General Requirements—Rating Specifications for A.C. Power Drive Systems Above 1000 V A.C. and Not Exceeding 35 KV," National Electrical Manufacturers Association (NEMA) Standards Publication ICS 61800-4, 2004, 139 pages.
Roe, "Practices and Procedures of Industrial Electrical Design," McGraw-Hill, 1972, ISBN: 0-07-053390-3, 17 pages.
Oehring et al., U.S. Appl. No. 62/242,173, 2015, 17 pages.
Samsung All-In-One Security System, Quick Start Guide Kit Model SDHC5100, printed 2022, 11 pages.
Amazon.com listing for Samsung SDH-C5100 16 Channel 720p HD DVR Video Security System, 2015, 2 pages.
Amazon.com listing for Amcrest ProHD Wireless IP Security Camera, 2015, 8 pages.
Amazon.com listing for Security & Surveillance Cameras, 2015, 6 pages.
Stewart, "Extracting the Digit!! Time for an ROV Electronics Shake-Up?," Kongsberg Simrad Ltd, UTI, 1997, 10 pages.
Martin et al., "Lessons Learned from 27 Years' Experience of Stimulation Vessel Design and Operation—a Case Study," SPE 166243, 2013, 12 pages.
Maddox, "Visualizing Production in Flowing Oil Wells," Halliburton Energy Services, SPWLA 37th Annual Logging Symposium, Jun. 16-19, 1996, 6 pages.
Cooper et al., "The First Purpose-Built Stimulation Vessel for North Sea Application," Dowell Schlumberger, Society of Petroleum Engineers of AIME, SPE 12993, 1984, 7 pages.
Talley, "Development of a Closed Circuit TV Borehole Probe," Design Engineering Laboratories, Inc., Contract H0308041, Sep. 1984, 22 pages.
Smith et al., "Fracture Width-Design vs. Measurement," Amoco Production Co., Society of Petroleum Engineers of AIME, SPE 10965, 1982, 9 pages.
Hurst et al., "Development and Application of 'Frac' Treatments in the Permian Basin," SPE 405-G, vol. 204, 1955, 8 pages.
Briggs, "Development of a Downhole Television Camera," Oceanographic Engineering Corporation, 1964, 1 page.
IPIECA About Us page, 2015, 1 page.
Appl et al., "A Viewing Lens for High Pressure Applications," Society of Petroleum Engineers of AIME, SPE-299, 1962, 7 pages.
Taylor, "Efficiency: Watchword of the Oil Industry," Financial Analysts Journal, 2018, 4 pages.
Pritchard, "U.S. Color Television Fundamentals: A Review," SMPTE Journal, Nov. 1977, vol. 86, 10 pages.
Moxastore website, listing for NPORTIA5250, 2015, 2 pages.
Moxastore website, About Us, 2015, 1 page.
Moxastore website, Homepage, 2015, 2 pages.
Moxastore website, listing for Moxa 802.11 Ethernet to Serial, 2016, 1 page.
Amazon.com listing for Global Cache iTach, IP to Serial with PoE (IP2SL-P) by Global Cach, 2014, 3 pages.
Amazon.com listing for SainSmart TCP/IP Ethernet to Serial RS232 RS485 Intelligent Communication Converter by SainSmart, 2014, 4 pages.
Amazon.com listing for TCP/IP Ethernet to Serial RS232 RS485 RS422 Converter by Atc, 2014, 2 pages.
Amazon.com listing for StarTech.com 1 Port RS232 Serial to IP Ethernet Converter (NETRS2321P) by StarTech, 2014, 4 pages.
Amazon.com listing for StarTech NETRS2321E 1 Port RS-232/422/485 Serial over IP Ethernet Device Server by StarTech, 2014, 4 pages.
OSHA-NIOSH Hazard Alert: Worker Exposure to Silica during Hydraulic Fracturing, U.S. Department of Labor, 2012, 15 pages.
Avallone et al., "Marks Standard Handbook for Mechanical Engineers 11th Edition," McGraw-Hill, 2007, 5 pages.

(56) References Cited

OTHER PUBLICATIONS

Fink, "Standard Handbook for Electrical Engineers," Thirteenth Edition, McGraw-Hill, ISBN: 0-07-020984-7, 7 pages (excerpts) (Part 1).
Albone, "Mobile Compressor Stations for Natural Gas Transmission Service," ASME 67-GT-33, Turbo Expo, Power for Land, Sea and Air, vol. 79887, p. 1-10, 1967.
Canadian Office Action issued in Canadian Application No. 2,928,707, dated Sep. 8, 2020.
Canadian Office Action issued in Canadian Application No. 2,944,980, dated Aug. 31, 2020.
Canadian Office Action issued in Canadian Application No. 2,982,974, dated Sep. 22, 2020.
Final Office Action issued in corresponding U.S. Appl. No. 15/356,436, dated Mar. 31, 2020.
Final Office Action issued in corresponding U.S. Appl. No. 16/404,283, dated Jan. 11, 2021.
Final Office Action issued in corresponding U.S. Appl. No. 16/597,014, dated Feb. 4, 2021.
Goodwin, "High-voltage auxiliary switchgear for power stations," Power Engineering Journal, 1989, 10 pg. (Year 1989).
"Heat Exchanger" (https://en.wikipedia.org/w/index.php?title=Heat_exchanger&oldid=89300146) Dec. 18, 2019 Apr. 2019 (Apr. 18, 2019), entire document, especially para (0001].
International Search Report and Written Opinion issued in PCT Application No. PCT/US2020/023809, dated Jun. 2, 2020.
International Search Report and Written Opinion issued in PCT Application No. PCT/US2020/023821, dated Aug. 28, 2020.
International Search Report and Written Opinion issued in PCT Application No. PCT/US2020/036932, dated Sep. 3, 2020.
International Search Report and Written Opinion issued in PCT Application No. PCT/US2020/053980, dated Dec. 14, 2020.
International Search Report and Written Opinion issued in PCT Application No. PCT/US2020/058899, dated Feb. 3, 2021.
International Search Report and Written Opinion issued in PCT Application No. PCT/US2020/058906, dated Feb. 2, 2021.
International Search Report and Written Opinion issued in PCT Application No. PCT/US2020/059834, dated Feb. 4, 2021.
International Search Report and Written Opinion issued in PCT Application No. PCT/US2020/066543, dated May 11, 2021.
International Search Report and Written Opinion issued in PCT Application No. PCT/US2020/067146, dated Mar. 29, 2021.
International Search Report and Written Opinion issued in PCT Application No. PCT/US2020/067523, dated Mar. 22, 2021.
International Search Report and Written Opinion issued in PCT Application No. PCT/US2020/067526, dated May 6, 2021.
International Search Report and Written Opinion issued in PCT Application No. PCT/US2020/067528, dated Mar. 19, 2021.
International Search Report and Written Opinion issued in PCT Application No. PCT/US2020/067608, dated Mar. 30, 2021.
Karin, "Duel Fuel Diesel Engines," (2015). Taylor & Francis, pp. 62-63, retrieved from https://app.knovel.com/hotlink/oc/id:kpDFDE0001/dual-fuel-diesel-engines/duel-duel-diesel-engines (Year 2015).
Morris et al., U.S. Appl. No. 62/526,869; Hydration-Blender Transport and Electric Power Distribution for Fracturing Operation; Jun. 28, 2018; USPTO; see entire document.
Non-Final Office Action issued in corresponding U.S. Appl. No. 14/881,525, dated Jul. 21, 2021.
Non-Final Office Action issued in corresponding U.S. Appl. No. 14/622,532, dated Aug. 5, 2015.
Non-Final Office Action issued in corresponding U.S. Appl. No. 15/145,443, dated May 8, 2020.
Non-Final Office Action issued in corresponding U.S. Appl. No. 15/356,436, dated Oct. 26, 2020.
Non-Final Office Action issued in corresponding U.S. Appl. No. 16/167,083, dated Aug. 31, 2020.
Non-Final Office Action issued in corresponding U.S. Appl. No. 16/356,263, dated Sep. 2, 2020.
Non-Final Office Action issued in corresponding U.S. Appl. No. 16/377,861, dated Jun. 22, 2020.
Non-Final Office Action issued in corresponding U.S. Appl. No. 16/404,283, dated Jun. 29, 2020.
Non-Final Office Action issued in corresponding U.S. Appl. No. 16/443,273, dated Oct. 5, 2020.
Non-Final Office Action issued in corresponding U.S. Appl. No. 16/458,696, dated May 22, 2020.
Non-Final Office Action issued in corresponding U.S. Appl. No. 16/728,359, dated Jun. 29, 2020.
Non-Final Office Action issued in corresponding U.S. Appl. No. 16/564,185, dated Jan. 29, 2021.
Final Office Action issued in corresponding U.S. Appl. No. 15/145,491, dated Sep. 6, 2017.
Non-Final Office Action issued in corresponding U.S. Appl. No. 16/871,928, dated Aug. 25, 2021.
Non-Final Office Action issued in corresponding U.S. Appl. No. 16/943,727, dated Aug. 3, 2021.
Non-Final Office Action issued in corresponding U.S. Appl. No. 15/183,387, dated Mar. 6, 2019.
Notice of Allowance issued in corresponding U.S. Appl. No. 15/829,419, dated Jul. 26, 2021.
Canadian Office Action issued in Canadian Application No. 2,928,711, dated Apr. 18, 2018.
"Water and Glycol Heating Systems" (https://www.heat-inc.com/wg-series-water-glycol-systems/) Jun. 18, 2018 (Jun. 18, 2018), entire document, especially WG Series Water Glycol Systems.
Woodbury et al., "Electric Design Considerations for Drilling Rigs," IEEE Transactions on Industry Applications, vol. 1A-12, No. 4, Jul./Aug. 1976, pp. 421-431.
Canadian Office Action issued in Canadian Application No. 2,833,711, dated Mar. 2, 2018.
Non-Final Office Action issued in U.S. Appl. No. 17/540,807 mailed Oct. 5, 2022.
Canadian Office Action issued in Canadian Application No. 2,886,697, dated Jun. 22, 2018.
Canadian Office Action issued in Canadian Application No. 2,933,444, dated Aug. 18, 2020.
Canadian Office Action issued in Canadian Application No. 2,936,997, dated Jan. 30, 2019.
Non-Final Office Action issued in corresponding U.S. Appl. No. 15/294,349, dated Mar. 14, 2017.
Mistry et al., "Induction Motor Vibrations in View of the API 541-4th edition," IEEE, Paper No. PCIC-, 2008, 10 pages.
Paschall et al., "Navigating the Test Requirements of API 541 4th Edition," IEEE, Paper No. PCIC-2007-11, 2007, 12 pages.
"G7 Adjustable Speed Drive Operation Manual," Toshiba, Document No. 51546-009, Mar. 2005, 221 pages.
"Weir SPM: General Catalog," Weir SPM, 2009, 40 pages.
Krueger, "Advances in Well Completion and Stimulation During JPT's First Quarter Century," Journal of Petroleum Technology, Dec. 1973, pp. 16.
Lietard et al., "Hydraulic Fracturing of Horizontal Wells: An Update of Design and Execution Guidelines," Society of Petroleum Engineers, SPE 37122, 1996, 15 pages.
Waters et al., "Simultaneous Hydraulic Fracturing of Adjacent Horizontal Wells in the Woodford Shale," Society of Petroleum Engineers, SPE 119635, 2009, 22 pages.
Bahadori et al., "Dictionary of Oil, Gas, and Petrochemical Processing," CRC Press, ISBN: 978-1-4665-8825-7, 2014, 8 pages.
"A Dictionary for the Oil and Gas Company—Second Edition," The University of Texas at Austin—Petroleum Extension Service, ISBN: 978-0-88698-240-9, 2011, 7 pages.
"Lessons Learned from Natural Gas STAR Partners: Reduced Emissions Completions for Hydraulically Fractured Natural Gas Wells," U.S. Environmental Protection Agency, 2011, 12 pages.
Kidnay et al., "Fundamentals of Natural Gas Processing—Second Edition," CRS Press, ISBN: 978-1-4200-8519-8, 2011, 19 pages (Part 1).
Kidnay et al., "Fundamentals of Natural Gas Processing—Second Edition," CRS Press, ISBN: 978-1-4200-8519-8, 2011, 17 pages (Part 2).

(56) References Cited

OTHER PUBLICATIONS

Kidnay et al., "Fundamentals of Natural Gas Processing—Second Edition," CRS Press, ISBN: 978-1-4200-8519-8, 2011, 12 pages (Part 3).
Listing at Amazon.com for Kidnay et al., "Fundamentals of Natural Gas Processing—Second Edition," CRS Press, ISBN: 978-1-4200-8519-8, Jul. 7, 2013, 4 pages.
Listing at Amazon.com for Kidnay et al., "Fundamentals of Natural Gas Processing—Second Edition," CRS Press, ISBN: 978-1-4200-8519-8, Feb. 22, 2015, 4 pages.
"Green Completions," IPIECA, Jan. 20, 2015, 7 pages.
"Sand Trap FAQ," Mountain Equipment of New Mexico, Inc., Jan. 8, 2014, 2 pages.
"Test Separators FAQ," Mountain Equipment of New Mexico, Inc., Jan. 8, 2014, 2 pages.
"Emergency Power Systems for Critical Facilities: A Best Practices Approach to Improving Reliability," FEMA, FEMA P-1019. Sep. 2014, 170 pages.
Persily et al., "Indoor Environmental Issues in Disaster Resilience," NIST Technical Note 1882, Jul. 2015, 40 pages.
"Precision Heat and Control Systems for Onshore Drilling and Production," Chromalox Precision Heat and Control, 2011, 6 pages.
"ZEUS Electric Pumping Unit," Halliburton, printed 2021, 4 pages.
Nayyar, "Piping Handbook—Seventh Edition," Piping Handbook, 1999, 77 pages.
"Wire Rope Isolator Technologies," ITT Enidine, Inc., Mar. 29, 2014, Enidine, 78 pages.
Gardner Denver, Well Servicing Pump, Model GD-2500Q, GD-2500Q-HD, Quintuplex Pumps, Super GWS Fluid End (Uni-Flange) Parts List, 310FWF997 Revision A, Sep. 2011, 45 pages.
Wachel et al., "Analysis of Vibration and Failure Problems in Reciprocating Triplex Pumps for Oil Pipelines," The American Society of Mechanical Engineers, 1985, 8 pages.
"Flowline Products and Services—World Proven Chiksan and Weco Equipment," FMC Technologies, Mar. 28, 2015, 31 pages (Part 1).
"Flowline Products and Services—World Proven Chiksan and Weco Equipment," FMC Technologies, Mar. 28, 2015, 49 pages (Part 2).
"A complete line of swivel joints for drilling, production, and well servicing," Chiksan Original Swivel Joints, Nov. 1996, 16 pages.
"Worlds Best Swivel Joints," FlowValve, Jan. 17, 2015, available at https://web.archive.org/web/20150117041757/http://www.flowvalve.com/swivels, 10 pages.
"Victualic Couplings—Vibration Attenuation Characteristics," Victaulic Company, Oct. 2014, 5 pages.
Hudson et al., "Modeling Victaulic Couplings in Piping Stress Analysis Programs," Victaulic Company, WP-18 6685 Rev. B, Mar. 19, 2013, 19 pages.
"AGS Flexible Coupling Style W77," Victaulic, Apr. 23, 2015, available at: https://web.archive.org/web/20150423052817/http://www.victaulic.com/en/products-services/products/style-w77-ags-flexible-coupling/, 1 page.
"Advanced Groove System (AGS) Large Diameter Solutions." Victaulic, Apr. 19, 2015, available at: https://web.archive.org/web/20150419063052/http:/www.victaulic.com/en/businesses-solutions/solutions/advanced-groove-system/, 2 pages.
"Accommodating Seismic Movement," Victaulic, Apr. 12, 2015, available at https://web.archive.org/web/20150412042941/http:/www.victaulic.com/en/businesses-solutions/solutions/accommodating-seismic-movement/, 2 pages.
Saville, "The Victaulic Pipe Joint," Journal (American Water Works Association), Nov. 1922, vol. 9, No. 6, 8 pages.
Balaji et al., "Wire rope isolators for vibration isolation of equipment and structures," IP Conference Series: Materials Science and Engineering, 2015, 12 pages.
"FlowGuard Products," CoorsTek, Sep. 15, 2014 available at: https://web.archive.org/web/20140915230538/http://coorstek.com/resource-library/library/8510-1747-FlowGuard-Pulsation-Dampers.pdf, 8 pages.
"FlowGuard Pulsation Dampeners," CoorsTek, Feb. 23, 2015, available at: https://web.archive.org/web/20150223101630/http://www.coorstek.com/markets/energy_equipment/oil-gas/flowguard.php, 2 pages.
Morton, "Unlocking the Earth: A Short History of Hydraulic Fracturing," GEO ExPro, vol. 10, No. 6, Dec. 2013, 5 pages.
"Welcome to STAUFF," STAUFF, Aug. 5, 2013, 1 page.
"STAUFF Clamps," STAUFF, Aug. 7, 2013, 3 pages.
"STAUFF Clamps, Heavy Series (DIN 3015-2)," STAUFF, Aug. 30, 2013, 1 page.
"Heavy Series (DIN 3015-2)", STAUFF, Product Literature, Nov. 3, 2013, 1 page.
"Heavy Series DIN 3015, Part 2," STAUFF, Nov. 5, 2013, 24 pages.
Harris et al., "Harris' Shock and Vibration Handbook—Fifth Edition," McGraw-Hill Handbooks, 2002 [excerpted], 22 pages.
"Mark's Standard Handbook for Mechanical Engineers, 11th Edition," McGraw-Hill, ISBN 0-07-142867-4, 2007 [excerpted], 1 page.
Mallik et al., "On the Modelling of Non-Linear Elastomeric Vibration Isolators," Journal of Sound and Vibration, 1999, 219(2), 15 pages.
Malcius, "Mathematical model evaluation and parameter identification of pipe holder element," Journal of Vibroengineering, Jun. 2013, vol. 15, Issue 2, ISSN 1392-8716, 9 pages.
Wachel et al., "Piping Vibration Analysis," Engineering Dynamics, Incorporated, Proceedings of the Nineteenth Turbomachinery Symposium, 1990, 16 pages.

\* cited by examiner

INTEGRATED MOBILE POWER UNIT FOR HYDRAULIC FRACTURING

RELATED APPLICATION

This application is a continuation of U.S. patent application Ser. No. 17/540,807 filed Dec. 2, 2021, titled INTEGRATED MOBILE POWER UNIT FOR HYDRAULIC FRACTURING, now U.S. Pat. No. 11,713,690 issued Aug. 1, 2023, which is a continuation of U.S. patent application Ser. No. 16/443,273 filed Jun. 17, 2019, titled INTEGRATED MOBILE POWER UNIT FOR HYDRAULIC FRACTURING, now U.S. Pat. No. 11,211,801 issued Dec. 28, 2021, which claims priority to U.S. Patent Provisional Application No. 62/685,797 filed Jun. 15, 2018, titled INTEGRATED MOBILE POWER UNIT FOR HYDRAULIC FRACTURING, the entirety of the disclosures of which are incorporated by reference herein for all intents and purposes.

BACKGROUND

1. Field of Invention

The present disclosure generally relates to hydraulic fracturing. In particular, the present disclosure relates to mobile grid assembly for powering an electric hydraulic fracturing pump in limited space environments.

2. Related Technology

Fracturing, such as hydraulic fracturing, stimulates production from hydrocarbon producing wells. Such a process may utilize mobile systems for injection of fluid into wellbores at pressure to provide subterranean fissures in the area around the wellbores. Such a process relies on fracturing fluid slurry that has been pressurized using high pressure pumps. As this is a mobile process, the high pressure pumps are mounted on mobile surfaces—e.g., truck-beds, trailers, etc. Moreover, the high pressure pumps are powered by mobile power sources, such as diesel engines. However, the components, such as the high pressure pumps and associated power sources have large volume and mass. As such, the mobile surfaces may be heavy duty trailers, trucks, or skids that are used for transporting these components to remote sites where wellbores are being fractured. The components support hydraulic fracturing pumps that draw low pressure fluid slurry (at approximately 100 psi). The discharge of the same fluid slurry, however, is at high pressures of up to 15,000 psi or more. In addition, alternate mobile power sources, such as turbine generators, are available to perform the power functions of the diesel engines. At the remote site, the power sources are electrically connected to power the fracturing components. For example, motors for pressurizing fracturing and hydraulic fluids are connected to the power sources using power buses. Electrical connections may be complex, unsafe, unreliable, and may include numerous configurations requiring space and time to resolve.

SUMMARY

Herein disclosed are examples of a hydraulic fracturing system that includes a singular mobile platform of at least one mobile power unit (MPU) and at least one first switch gear that is configured to handle electric power from the MPU. The at least one MPU is configured to generate voltage that matches the requirements of load and an electrical bus of the at least one first switch gear, such that a combined electrical current generated as a result of the generated voltage is provided through the electrical bus to the components of the hydraulic fracturing system. Further, the hydraulic fracturing system may include electrical fracturing equipment with at least one second switch gear to support the at least one first switch gear in handling electric power from the at least one MPU. Automated control software may be included in the system to control load shedding, load sharing, and power distribution for the electrical fracturing equipment comprising the at least one second switch gear. In addition, the switchgear may be separate units or incorporated into the MPUs. Fracturing equipment, including the electrical load, may include specific voltage and current requirements. The electrical bus is, therefore, sized to match the MPU's capabilities based on the load requirements. Electrical buses may be rated in terms of maximum capability before failure, such as a voltage class of 5000V, 15000V, or 25000V, and having a current rating such as 1200 A, 2000 A, or 3000 A.

BRIEF DESCRIPTION OF THE DRAWINGS

Some of the features and benefits of the present invention having been stated, others will become apparent as the description proceeds when taken in conjunction with the accompanying drawings, in which.

Figure 1:
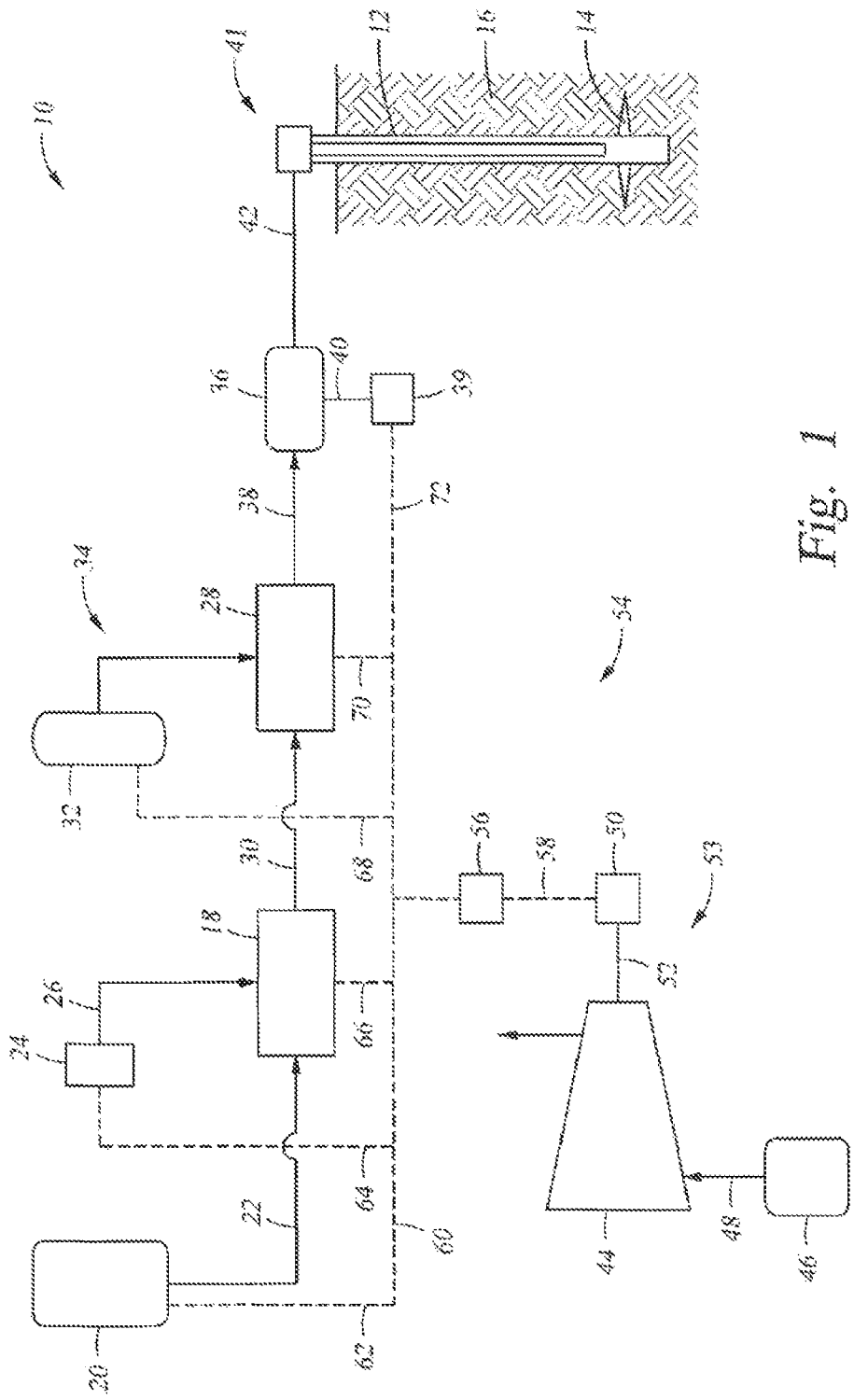
FIG. 1 is a schematic of an example hydraulic fracturing system in accordance with embodiments of the present disclosure.

While the invention will be described in connection with the preferred embodiments, it will be understood that it is not intended to limit the invention to that embodiment. Instead, the preferred embodiments are intended to cover all alternatives, modifications, and equivalents, as may be included within the spirit and scope of the invention as defined by the appended claims

DETAILED DESCRIPTION OF THE DISCLOSURE

So that the manner in which the features and advantages of the embodiments of hydraulic fracturing system and associated methods, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

One system and method for powering electrical equipment from a generator uses a physically separate mobile unit with switch gear installed to act as an electrical distribution hub between the MPUs and electric fracturing equipment of a hydraulic fracturing system. The separate mobile unit is, therefore, physically external relative to a mobile unit hosting the generator and switch gear, for instance. In such an implementation, cables are used to supply power from the MPUs to the mobile switch gear unit and between the mobile switch gear unit to the electric fracturing equipment. Here, fleet wide load sharing and load shedding are available, but such an implementation requires more mobile equipment and power cables. Alternatively, another system and method uses a smaller and less versatile Electronic Equipment Room (EER), with switch gear for the generator, to directly power a small amount of electric equipment. Such a system and method may require lesser physical equipment, but is also electrically limited. For example, such limitations may be for load sharing and load shedding, which may be limited to only the equipment being supplied by a single MPU.

The present embodiments, by at least an MPU working with the switch gear in a single platform or unit resolves the additional issues noted above with the system and methods for a physically separate (e.g., external) mobile unit and an EER. For example, the present implementation at least ensures that MPUs are configured with adequate bus work to carry the generated voltage and current from the MPU's generator. This is further supported by the single platform or unit with reduced cabling and complexity with the MPU sharing space with the switch gear, for instance. The present implementation works with well sites where space is limited and rapid mobilization and demobilization is required. With integrated components on a single skid, for example, fewer physical connections are needed to be established or stowed during transportation. In an example, mobilization and demobilization of a single MPU are then limited to oilfield functions, such as pump down jobs, injection testing, toe preps, low hydraulic horsepower jobs, or to supplement other equipment types (diesel, dual fuel). In addition, extra MPUs and pumps can be used to perform fracturing jobs with high hydraulic horsepower requirements.

Furthermore, the use of integrated switch gear with the MPU eliminates the need for a separate switch gear trailer or skid. This allows for fewer trailers and fewer interconnecting cables saving space and time during mobilization/demobilization. With fewer trailers and cables, capital and maintenance costs are also beneficially addressed by the present implementation. The method of equipment deployment, in the present implementation, is also modular and scalable as turbines of the MPU can be added to directly to power the electric fracturing pumps as needed without the need to add additional switch gear trailers or modify existing trailers with additional gear and cable connections. A complexity sought to be addressed herein is a difficulty to implement a common bus where much of the equipment is on the same circuit. As such, the common bus of the present disclosure supports the voltage and combined current requirements of the various equipment loads. At fracturing sites, fracturing pumps may be inoperable because of fluid distribution problems, mechanical problems, communication problems, control problems, pump problems, sensor problems, etc. While these are unrelated to the electric power generation requirements discussed herein, without a common electrical bus, excess power from a turbine generator cannot be redistributed to other equipment which will limit redundancy in equipment and may cause situations where extra turbines and fracturing pumps will need to be on standby in the event of failures. Other oilfield equipment may be connected to the common electrical bus. In an example, the other oilfield equipment includes intensifier pumps, blenders, dual blenders, hydration units, chemical additive units, data van, sand equipment, lights, CNG equipment, LNG equipment, gas compression, gas filtration, wireline, water transfer, flow back, coil tubing, nitrogen, cementing, dual pumper, drilling rigs, cranes, and workover rigs. There may also be a case where, when a turbine generator fails, the fracturing pumps or other equipment which are electrically tied to it will be rendered inoperable and power will not be available from other generators due to a lack of a common bus for power distribution. As such, the present implementation overcomes these additional issues by load sharing switch gear added to the MPUs in the same trailer or to other connected equipment, but working with the switch gear of the MPUs as discussed throughout this disclosure.

One of ordinary skill would recognize that there are space constraints of mobile equipment. As such, the turbine engine and generators of the MPU in the present implementation may need to be smaller to accommodate the extra integrated switch gear. The reduction in size and capability can create situations where extra MPUs will be needed on well sites with higher hydraulic horsepower requirements. However, to save space and weight, alternative engines and generators may be used (such as aeroderivative turbines or reciprocating engines). Many light and compact turbines may also struggle to burn wide ranges of fuel gas and may need support equipment if the upper or lower heating values are out of the required range, but with the present implementation, redundancies are widely applied to assist with any of these constraints.

The present disclosure, in an embodiment, is to a system including a mobile unit, at least one generator; and at least one switch gear. The at least one generator is coupled to the at least one switch gear on the mobile unit forming a singular and integrated mobile unit. The mobile unit is configured to provide power generated by the at least one generator in electrical buses for at least one load on one or more external mobile unit. In another embodiment, a method is disclosed and includes providing a mobile unit with at least one generator and at least one switchgear, such as a system as described above. The at least one generator is coupled to the at least one switch gear on the mobile unit. The method includes generating power from the at least one generator and providing the power in electrical buses for at least one load in one or more external mobile units. The system may be part of a hydraulic fracturing system that consumes the power and that includes a wellbore and at least one pressuring system to create fractures in a subterranean formation that surrounds the wellbore.

FIG. 1 is a schematic of an example hydraulic fracturing system 10 in accordance with embodiments of the present disclosure. Such a system may be used for pressurizing a wellbore 12 to create fractures 14 in a subterranean formation 16 that surrounds the wellbore 12. System 10 may include a hydration unit 18 that receives fluid from a fluid source 20 via line 22, and may also receive additives from an additive source 24 via line 26. Additive source 24 can be separate from the hydration unit 18 as a stand-alone unit, or can be included as part of the same unit as the hydration unit 18. The fluid, which in one example is water, is mixed inside of the hydration unit 18 with the additives. The fluid and additives are mixed over a period of time to allow for uniform distribution of the additives within the fluid.

In the example of FIG. 1, the fluid and additive mixture is transferred to a blender unit 28 via line 30. A proppant source 32 contains proppant, which is delivered to the blender unit 28 as represented by line 34, where line 34 can be a conveyer. Inside the blender unit 28, the proppant and fluid/additive mixture are combined to form a fracturing slurry, which is then transferred to a fracturing pump system 36 via line 38; thus fluid in line 38 includes the discharge of blender unit 28 which is the suction (or boost) for the fracturing pump system 36. Blender unit 28 can have an onboard chemical additive system, such as with chemical pumps and augers (not shown). Optionally, additive source 24 can provide chemicals to blender unit 28; or a separate and standalone chemical additive system (not shown) can be provided for delivering chemicals to the blender unit 28. In an example, the pressure of the slurry in line 38 ranges from around 80 psi to around 120 psi. The pressure of the slurry can be increased up to around 15,000 psi by pump system 36. A motor 39, which connects to pump system 36 via connection 40, drives pump system 36 so that it can pressurize the slurry.

In one example, the motor 39 is controlled by a variable frequency drive ("VFD"). After being discharged from pump system 36, slurry is injected into a wellhead assembly 41; discharge piping 42 connects discharge of pump system 36 with wellhead assembly 41 and provides a conduit for the slurry between the pump system 36 and the wellhead assembly 41. In an alternative, hoses or other connections can be used to provide a conduit for the slurry between the pump system 36 and the wellhead assembly 41. Optionally, any type of fluid can be pressurized by the fracturing pump system 36 to form a fracturing fluid that is then pumped into the wellbore 12 for fracturing the formation 14, and is not limited to fluids having chemicals or proppant. Examples exist wherein the system 10 includes multiple pumps 36, and multiple motors 39 for driving the multiple pumps 36. Examples also exist wherein the system 10 includes the ability to pump down equipment, instrumentation, or other retrievable items through the slurry into the wellbore.

FIG. 1 additionally provides an example turbine 44, which receives a combustible fuel from a fuel source 46 via a feed line 48. In an example, the turbine is part of a Mobile Power Unit (MPU) or platform. The MPU may be a trailerized, bodyload, or skid mounted electrical power generation unit which can use the turbine or reciprocating engine for power generation. Such a turbine or reciprocating engine can be fueled by the combustible fuel, such as diesel or natural gas, to function as an electrical generator. The MPU can comprise of one or more trailers, composed of the generator, the electrical switching gear, a prime mover (engine), auxiliary loads (cooling, heating, lubricating, diagnostics and control equipment), and fire suppression equipment. The fire suppression equipment can be located on a single chassis, or each on separate chassis or any combination thereof for mobilization purposes which are mechanically or electrically connected while in operation to act as a single power generation unit.

In one example, the fuel source 46 can be a natural gas pipeline, CNG, LNG, or a well proximate the turbine 44. Combustion of the fuel in the turbine 44 in turn powers a generator 50 that produces electricity. Shaft 52 connects generator 50 to turbine 44. The combination of the turbine 44, generator 50, and shaft 52 define a turbine generator 53. In another example, gearing can also be used to connect the turbine 44 and generator 50. An example of a micro-grid 54 is further illustrated in FIG. 1, and which distributes electricity generated by the turbine generator 53. Included with the micro-grid 54 is an optional transformer 56 for stepping up or down voltage of the electricity generated by the generator 50 to a voltage more compatible for use by electrical powered devices in the hydraulic fracturing system 10.

A "split bus" (e.g., dual or triple, or more microgrid) or "single bus" (e.g., microgrid) electric hydraulic fracturing fleet may be available to function with the present disclosure. As used herein, the microgrid may be an off-utility power grid that is closed circuit and self-contained. For example, the microgrid may include at least one electricity generator, one switch gear component, and one active electrical load. The microgrid may also be synced with the utility power grid and pull additional power from the utility power grid. The utility power may be unable to provide all of the needed power for oilfield hydraulic fracturing, drilling, intervention, and other oilfield services; and the use of the microgrid is to supplement or replace the utility power. The split or single bus use external switch gear trailers which are physically separate from the MPU to provide extra switch gear (e.g., breakers, relays, electrical buses) to allow electrical power to be placed on a common bus (e.g., combining the power of two or more generators). The present disclosure, via at least FIGS. 3 to 9, provide novel packaging of the MPU and at least the switch gear to allow a savings on quantity of trailers and to reduce the complexity of the electrical connections. Such a reduction may be by reducing a number of interconnecting power cables. This reduction in equipment will not reduce functionality but will improve mobilization times and simplicity of interfacing various components of the hydraulic fracturing system 10, while reducing space required on a well site as well as capital cost and maintenance costs. In an example, such equipment may include hydraulic fracturing equipment that represents an electrical load addressed by the MPU of the present disclosure. As such the equipment can include hydraulic fracturing pumps, hydration units, chemical units, blenders, proppant storage, conveyer belts, lights, datavans, cranes, wireline equipment, monitoring equipment, water pumps, compressors, heaters, and other supporting equipment.

The switch gear may be any gear such as breakers, switches, and relays that are used to control the distribution of electricity. Electrical safety and diagnostics may also be provided by the switch gear. Each MPU may include at least one large breaker for connecting and disconnecting its own generator from the electrical load. The MPUs may be limited in how much switch gear can be integrated into its chassis due to size and weight requirements for mobility. Many times a separate electronic equipment room is used to supplement the generator to provide switch gear support or dedicated switch gear units (trailers, skids, bodyload trucks) are used to provide load sharing and greater distribution.

In another example, the power generated by the turbine generator and the power utilized by the electrical powered devices in the hydraulic fracturing system 10 are of the same voltage, such as 4160 V so that main power transformers are not needed other than as isolation transformers. In one embodiment, multiple 3500 kVA dry cast coil transformers are utilized. Electricity generated in generator 50 is conveyed to transformer 56 via line 58. In another embodiment, a step-up transformer is provided for transformer 56, where the secondary voltage of the step-up transformer is higher than its primary voltage. Such a usage may be advantageous for remote power transmission to limit transmission losses. In one example, transformer 56 steps the voltage down from 13.8 kV to around 600 V. Other example step down voltages include 4,160 V, 480 V, or other voltages. The output or low voltage side of the transformer 56 connects to a power bus 60, lines 62, 64, 66, 68, 70, and 72 connect to power bus 60 and deliver electricity to electrically powered end users in the system 10. In another example, line 62 connects fluid source 20 to bus 60, line 64 connects additive source 24 to bus 60, line 66 connects hydration unit 18 to bus 60, line 68 connects proppant source 32 to bus 60, line 70 connects blender unit 28 to bus 60, and line 72 connects motor 39 to bus 60. In an example, additive source 24 contains ten or more chemical pumps for supplementing the existing chemical pumps on the hydration unit 18 and blender unit 28. Chemicals from the additive source 24 can be delivered via lines 26 to either the hydration unit 18 and/or the blender unit 28. In one embodiment, the elements of the system 10 are mobile and can be readily transported to a wellsite adjacent the wellbore 12, such as on trailers or other platforms equipped with wheels or tracks.

Figure 2:
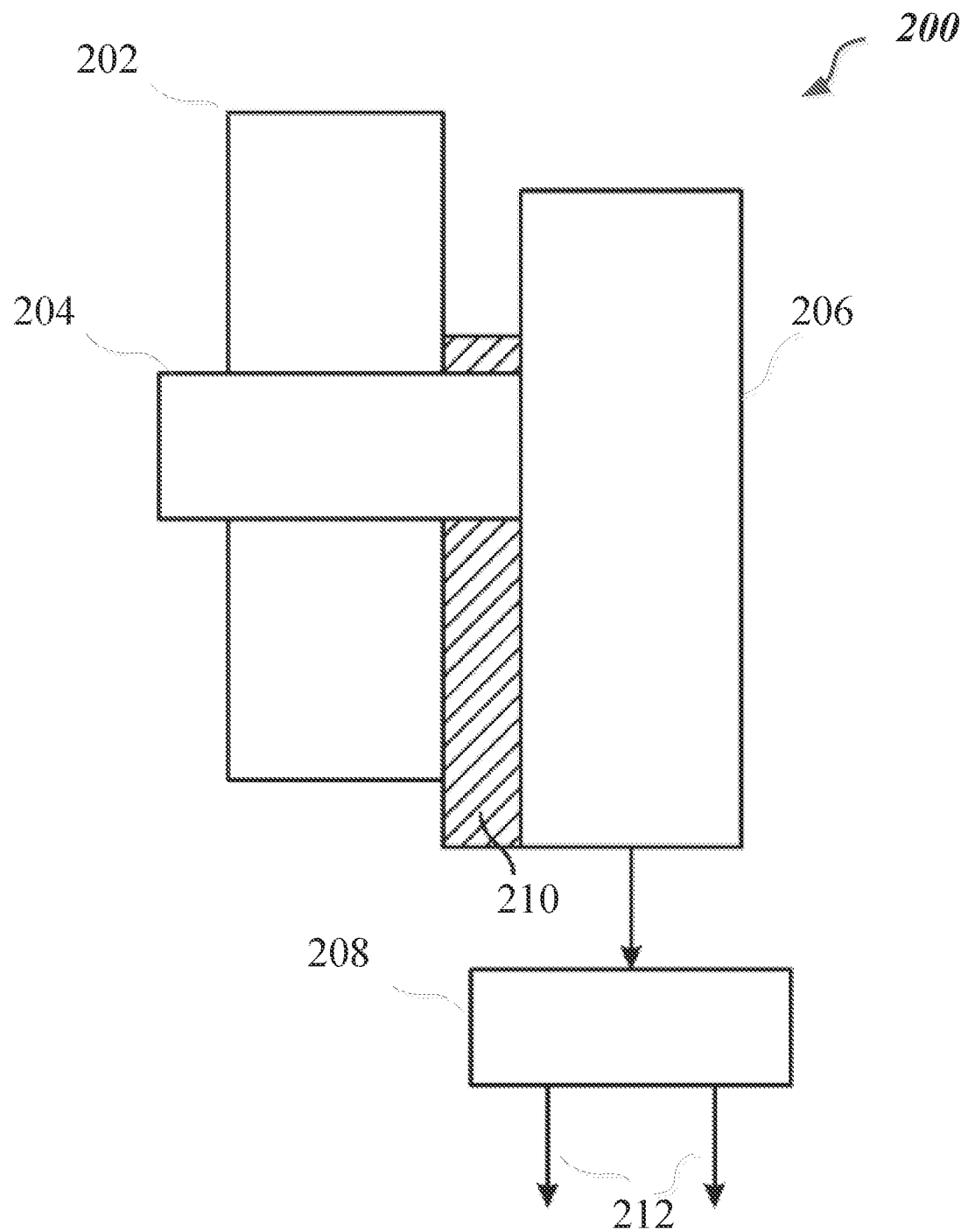
FIG. 2 is an elevation schematic of example portions of an MPU, including at least a turbine, generator, and EER in one or more trailers.

FIG. 2 is an elevation schematic of example portions 200 of the hydraulic fracturing system 10 of FIG. 1. FIG. 1 particularly illustrates some basic components of the hydraulic fracturing system 10 at a wellbore site for providing electrical load sharing. An MPU 200 includes a turbine generator 202 that may be supported by a natural gas turbine engine coupled to a three-phase, 60 hertz (Hz) electric generator to produce power as the turbine engine rotates. In an alternative, the generator can generate electricity at 50 Hz, or at any other frequency useful for hydraulic fracturing fleets. In the illustrated embodiment, the MPU includes components with reference numerals 202, 204, 206, and 210. Reference numeral 202 is a turbine generator mounted within a trailer, for example. However, references to the turbine generator are interchangeably used with reference to a trailer including these components, and the reference numeral 202. The same applies to reference numeral 204 providing an air intake filter, to reference numeral 206 providing an EER (sometimes referred to as a control trailer), and to reference numeral 210 providing a walk area. As such, the MPU is shown as including an electronic equipment room (EER) 206, which can house wiring, breakers, controls, monitoring systems, fire suppression support, auxiliary transformers, and a battery bank for secondary power when the turbine generator is not operating and there is no other power source. Some of the auxiliary components in the EER, such as the fans, lube motors, valves, etc., as well as some of the support equipment, such as gas compressors, gas heaters, and filtration systems, use lower voltage than what is generated. In an example, such lower voltages may be 120V, 240V, and 480V. The auxiliary transformer, in another example, is smaller than the fracturing pump step down transformers. FIG. 1 also illustrates an air intake filter house 204 that may be positioned on top of or adjacent to the MPU turbine generator arrangement 202, and a walk area 210 that may be connected to the MPU turbine generator arrangement 202 and EER 206 to enable personnel access. The example portions 200 can be taken as an example of an electrical microgrid.

In an example, the EER 206 may include other components than recited above and may be named differently but performs the general functions noted above. For example, the EER 206 is a support unit that may be part of the MPU and may include communications, switch gear, fire suppression, motor control center (MCC) for auxiliary loads, technician monitoring space, battery backups for critical auxiliary equipment, transformers, air compressors, and data monitoring/recording. The MPU may have a dedicated trailer for these components alone, while other have parts of this may be integrated into the generator spaces of the MPU.

In some examples, the battery bank of the EER 206 can power lighting, fire suppression, emergency turbine lube pumps, and onboard electronics. A switch gear trailer 208 may provide output 212 for power distribution, high voltage breakers, and "lock-out, tag-out" capabilities. "Lock-out, tag-out" is an understood safety procedure to ensure that dangerous machines are properly shut off and not able to be started up again prior to the completion of maintenance or servicing work.

Figure 3:
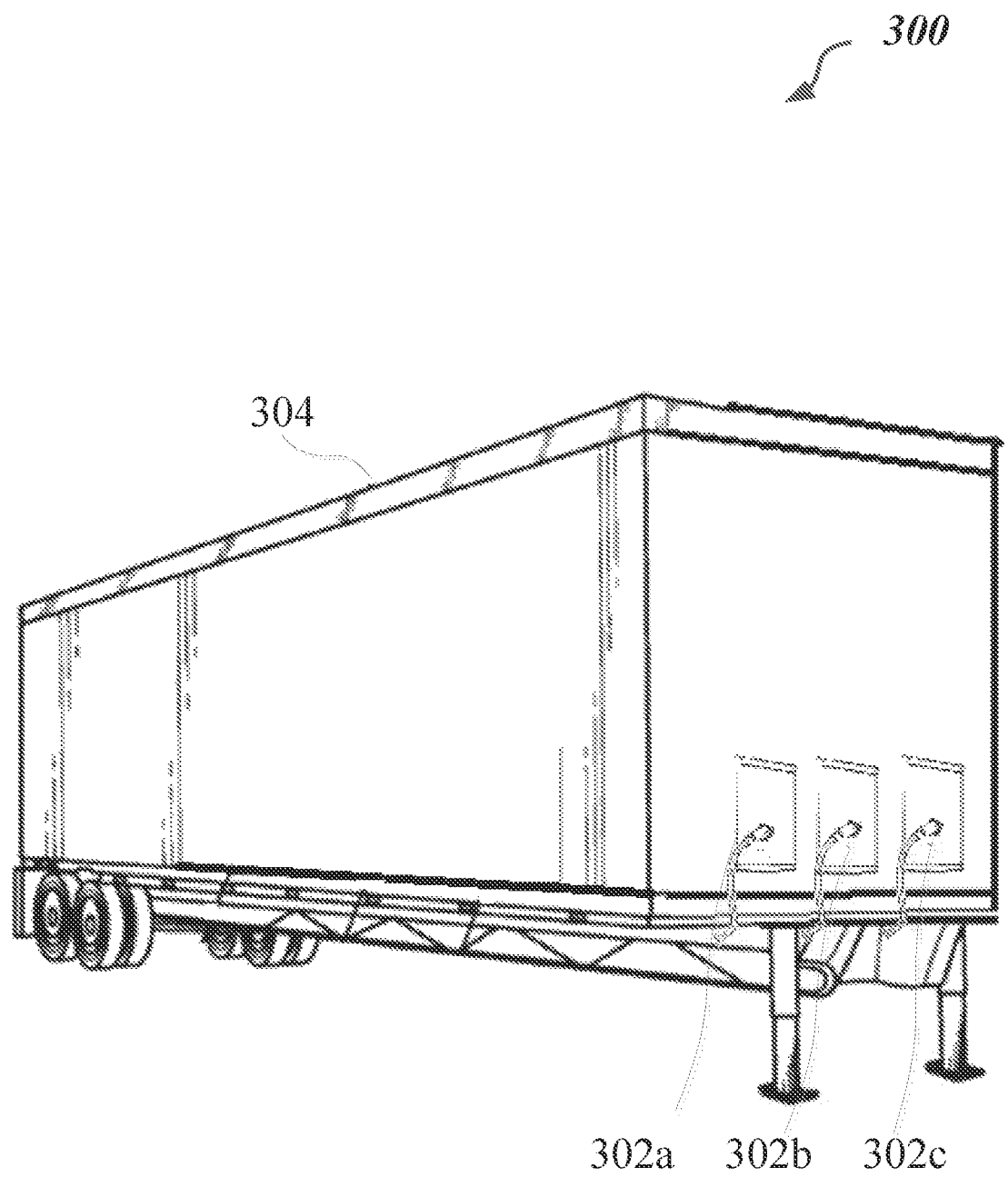
FIG. 3 is an end perspective view of an example of a mobile platform that includes one or more mobile power units (MPUs) that is integrated to or with switch gear components, according to embodiments in the present disclosure.

FIG. 3 is an end perspective view of an example of a mobile platform 300 that includes one or more mobile power units (MPUs) that is integrated to or with switch gear components, according to embodiments in the present disclosure. As such, the mobile platform 300 includes switch gear and MPU components within trailer 304. While the drawings provide a single trailer to demonstrate that the MPU components reside within the single trailer with the switch gear components, this is merely for illustrative purposes. The integration may be by components of the switch gear physically or electrically coupled between and throughout the components for the MPUs. As such, the reference to trailer 304 is merely illustrative to indicate at least where the substantial components for these units may be located.

At least one first switch gear integrated in the MPU provides electrical output connections 302a-c to handle electric power from at least one turbine generator in the trailer 304. The MPUs, therefore, include area for the switch gear, and include the at least one turbine generator that is configured to output a voltage that matches the requirements of load components. In addition, multiple MPUs may be coupled together on a common electrical bus such that a combined electrical current generated as a result of the voltage from the multiple MPUs drives current through the common bus to the components of the hydraulic fracturing system. Example configurations to support such a voltage requirements with current capabilities are provided in FIGS. 4-9. Further, the hydraulic fracturing system of the present disclosure may include electrical fracturing equipment in a separate trailer or on the ground by the wellbore with at least one second switch gear to support the at least one first switch gear providing electrical output connections 302a-c for handling electric power from the MPU in trailer 304, and also, from other MPUs, using a common bus, for instance. A datavan (a separate mobile platform) for data may be included in the system for load shedding, load sharing, and power distribution for the electrical fracturing equipment comprising the at least one second switch gear. As such, a datavan is, herein, referring to a trailer housing communications and controls for all of fracturing system and to enable hydraulic fracturing operations where a focus of the operations is on the wellhead and fluid pumping instead of power generation. The load shedding system may also include load-inhibit functionality to prevent a pump operator from running a pump or system of pumps and other equipment at a higher load level than power can be supplied. In addition, the load shedding system may also take action to drop one or more loads in a predetermined sequence to ensure that the hydraulic fracturing system is not overloaded. In another example, the load shedding system may reduce the rate of pumps and other equipment that are loaded to the hydraulic fracturing system. The reduction of the load in this manner is an alternative to fully shutting off the pumps and the other equipment.

Figure 4:
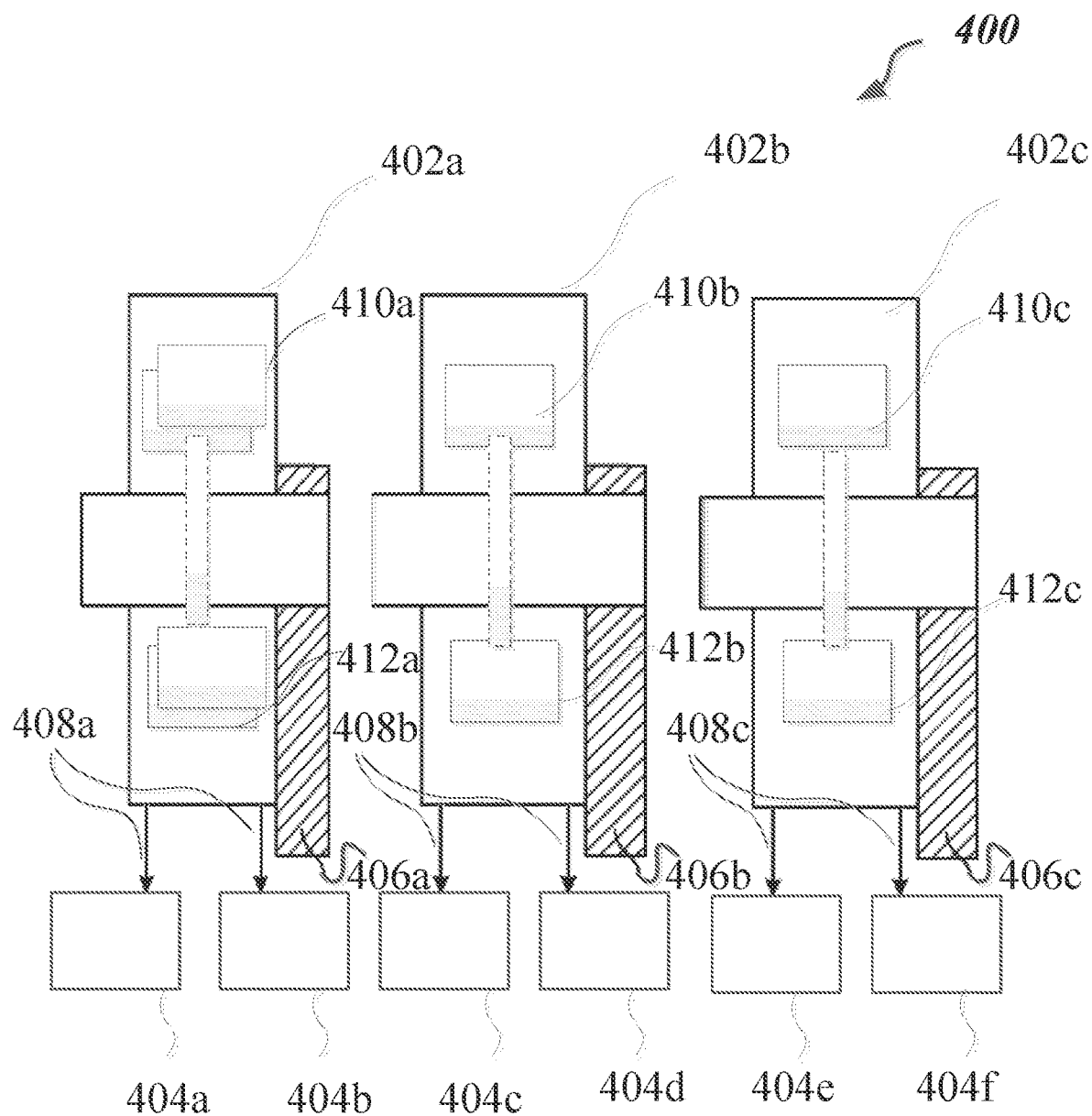
FIG. 4 is an elevation schematic of portions of the hydraulic fracturing system in accordance with one example configuration of the embodiments herein.

FIG. 4 is an elevation schematic of portions 400 of a hydraulic fracturing system in accordance with one example configuration of the present disclosure. MPUs 402a-c include single or multiple turbine generators 410a-c and switch gear 412a-c, which are illustrated as directly powering fracturing pump trailers or units (FPs) 404a-f. In this example configuration, separate switch gear equipment or common bus is not provided. Each respective switch gear (breakers or relays) 412a-c is integrated into each respective trailers 402a-c forming integrated MPUs. Power cable connections 408a-c are provided to transmit power from the turbine generators 410a-c integrated with or to the switch gear 412a-c, shown by dotted lines connecting the boxes 410-412. This may be the case in each trailer or mobile platform forming MPU 402 and couple to the respective FPs 404a-f. Even though the drawings provide the MPU as including the turbine generators and the switch gear as two separate reference numerals 410 and 412 for illustrative purposes, a person of ordinary skill would recognize that these are integration in physical layout or connectivity. This is also the case for the other example configurations provided herein. In addition, transformers may be used between each respective FP 404 and switch gear 412 combination of the embodiment in FIG. 4 to condition the power for use by the fracturing equipment.

Due to the integrated switch gear of this example configuration, the MPUs 402 including the turbine generators 410a-c, may have a smaller power output and can only power a limited number of FPs. Walkways 406a-c are available to access the integrated MPUs and switch gear. The turbine and generator components are downgraded from traditional usage and a single trailer used for the integrated MPU is a heavy duty trailer that includes three or more axles. In example, instead of a traditional four 5.7 MW turbine generator configuration, an integrated MPU may use integrated switch gear with five 5 MW turbine generators. The integration and elimination of the EER and Switch Gear are beneficial to reduce complexity and to promote reliability of a new configuration as presently disclosed. As such, the at least one switchgear used in any embodiment may be physically arranged to replace an EER of at least one mobile unit that may have been designed to include the EER. In addition, an MPU that is integrated with the switch gear in a single trailer eliminates the requirement for the walkway 406 as well. As such, the present embodiments merely illustrate the walkways for exemplary purposes. Further, MPUs 402, may include multiple turbine generators 410a and switch gear 412a. Without a common bus, power cannot be distributed to or from other MPUs. As such, FIG. 4 illustrates each MPU 402 as powering two separate FPs, but it is possible to power a single FP, or multiple FPs depending on the integrated switch gear and power requirements of each pump (or conversely, the power output of each MPU 402a-c). While the reference to an MPU is generally made, the reference may be to a single MPU of a single trailer 402a, b, or c, or to multiple MPUs in each of the single trailers 402a, b, and c. Different hydraulic horsepower requirements are provided and MPU/FP matches are identified for so that they can be added or removed for a modular set up based on specific needs.

Figure 5:
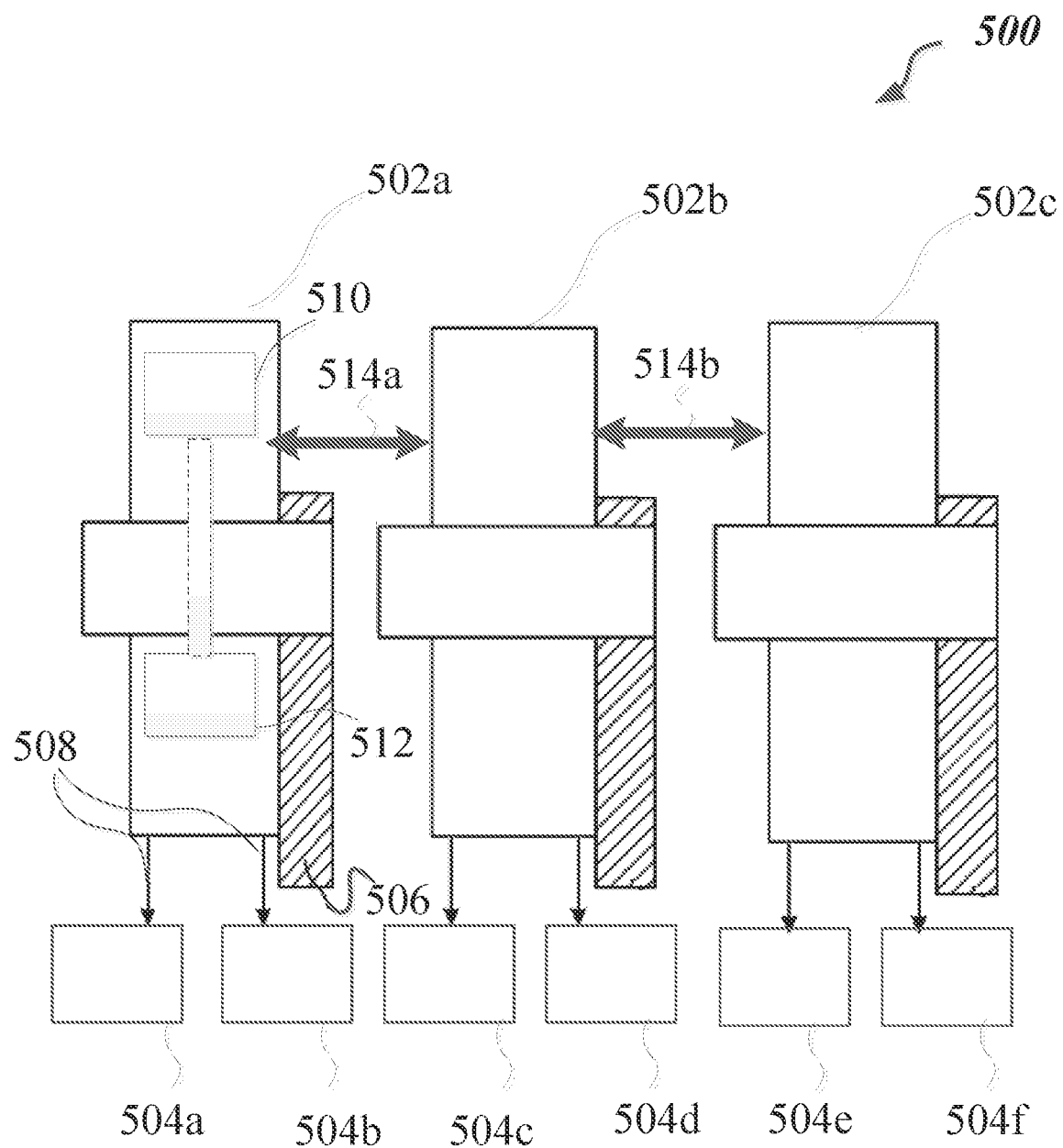
FIG. 5 is an elevation schematic of portions of a hydraulic fracturing system in accordance with another example configuration of the embodiments herein.

FIG. 5 is an elevation schematic of portions 500 of a hydraulic fracturing system in accordance with another example configuration of the present disclosure. Here, the example reference numerals are provided for at least one MPU 502a and FPs 504a,b combination, but a person of ordinary skill would recognize that the description supporting the example reference numerals are available to the other combinations of the mobile platforms 502b,c and FPs 404c-f. In this configuration, power cable interconnects 514a,b are provided between the MPUs 502a-c to act as a common bus for load sharing. As in the prior configuration, optional walkways 506 are provided for personnel access. Power cable connections 508 are provided to transmit power from the turbine generator 510 integrated with the switch gear 512 to the respective FPs 504a-f. Extra components (e.g., fuses, switches, etc.) in switch gear 512 and larger internal busses are additionally provided, as required and as discussed herein, to handle higher electrical loads than a single MPU can output. Communications between turbine control systems (computers) are also provided, as required, to support redundancy in this configuration. As such, a configuration as in FIG. 5 allows the switch gear, interconnect cables, and electrical bus bars are sized to handle all of the available electrical current that can be generated by the combined MPUs.

Alternatively, the sizing is in accordance with a selective use of interconnects for just portions of the system components. Such portions are determined based at least in part on the load ratings provided for the components. In this process, when the selective use is applied, controls are provided to open or close the load sharing switch gear for protection against overcurrent situations. Switches, fuses, and other failsafe components understood to handle overcurrent situations are available in the present disclosure to work with the switch gear. With a common bus 514, it is also possible to apply a load shedding control system which can shutdown (e.g., using a stop command) or which can open a breaker for FPs 504 if the power demand exceeds the available power production. This can happen if extra fluid rate is needed or if wellhead pressure increases unexpectedly, or if an MPU fails. The present disclosure also anticipates that a turbine can fail and electrical load will need to be lowered immediately to prevent the other MPUs from over loading and shutting down for protection. The additional components of the integrated switch gear supports and resolve such issues.

Figure 6:
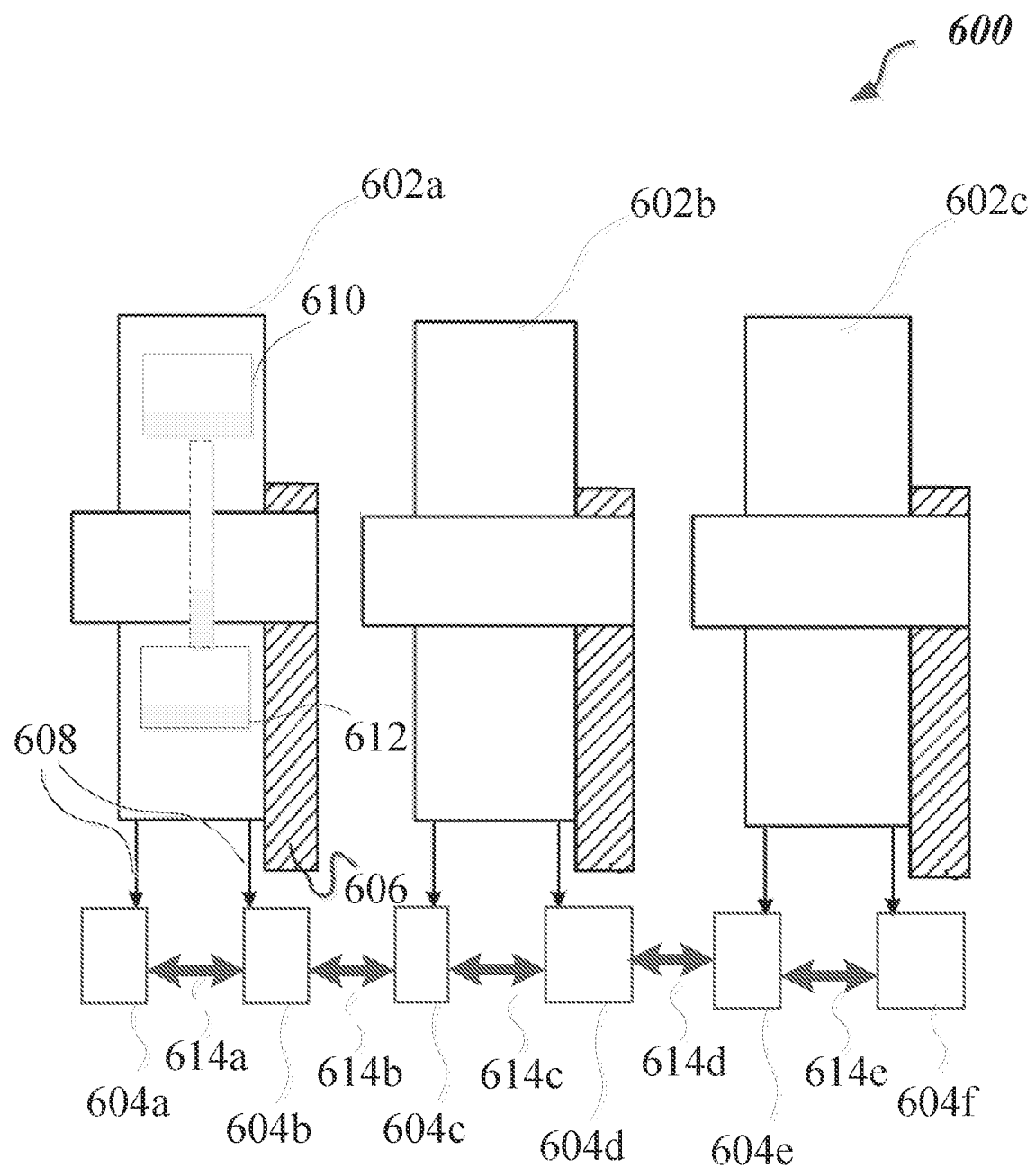
FIG. 6 is an elevation schematic of portions of a hydraulic fracturing system in accordance with yet another example configuration of the embodiments herein.

FIG. 6 is an elevation schematic of portions 600 of a hydraulic fracturing system in accordance with yet another example configuration of the present disclosure. Here, like the prior example, the reference numerals are only provided for at least one MPU 602a and FPs 604a,b combination, but a person of ordinary skill would recognize that the description supporting the example reference numerals are available to the other combinations of the MPUs 602b,c and FPs 604c-f. In this configuration, power cable interconnects 614a-e are provided between a VFD (Variable Frequency Drive)/MCC (Motor Control Center) compartment of the FP 604a-f instead of on the areas for the turbine generator 610 in each of the MPUs 602a-c. As in the prior configuration, optional walkways 606 are provided for personnel access. Power cable connections 608 are provided to transmit power from the MPUs 602 (with integrated switch gear 612 and turbine generator 610) to the respective FPs 604a-f. Extra components (e.g., fuses, switches, etc.) in switch gear 612 and the VFD/MCC and larger internal busses are additionally provided, as required and as discussed herein, to handle higher electrical loads than a single MPU can output.

This example configuration bears similarities to the example configuration of FIG. 5. A difference in this example is that extra load sharing switch gear for the common bus 614 will be in a VFD/MCC compartment of the FP 604 instead of in the area for the turbine generator 610 of the MPU 602. Further, it may not be essential for all interconnecting cables to be used, as long as the fracturing pump trailers 604 are in electrical communication with a source of electric power, a single interconnect will suffice. For example, FP 604a,b does not need to have an interconnect 614a, or FP 604e may not need to have an interconnect 608 with MPU 602c in the illustrated mobile platform as long as it can share power from FP 604d or FP 604f. In this and any of the embodiments, at least one VFD at least one MCC is provided on individual ones of the one or more external mobile units of the embodiments, such that these components, via the one or more external mobile units, is therefore, physically external relative to the mobile unit— such as the MPU 602—hosting the generator and switchgear. However, extra load sharing switch gear may be in the one or more external mobile units.

Figure 7:
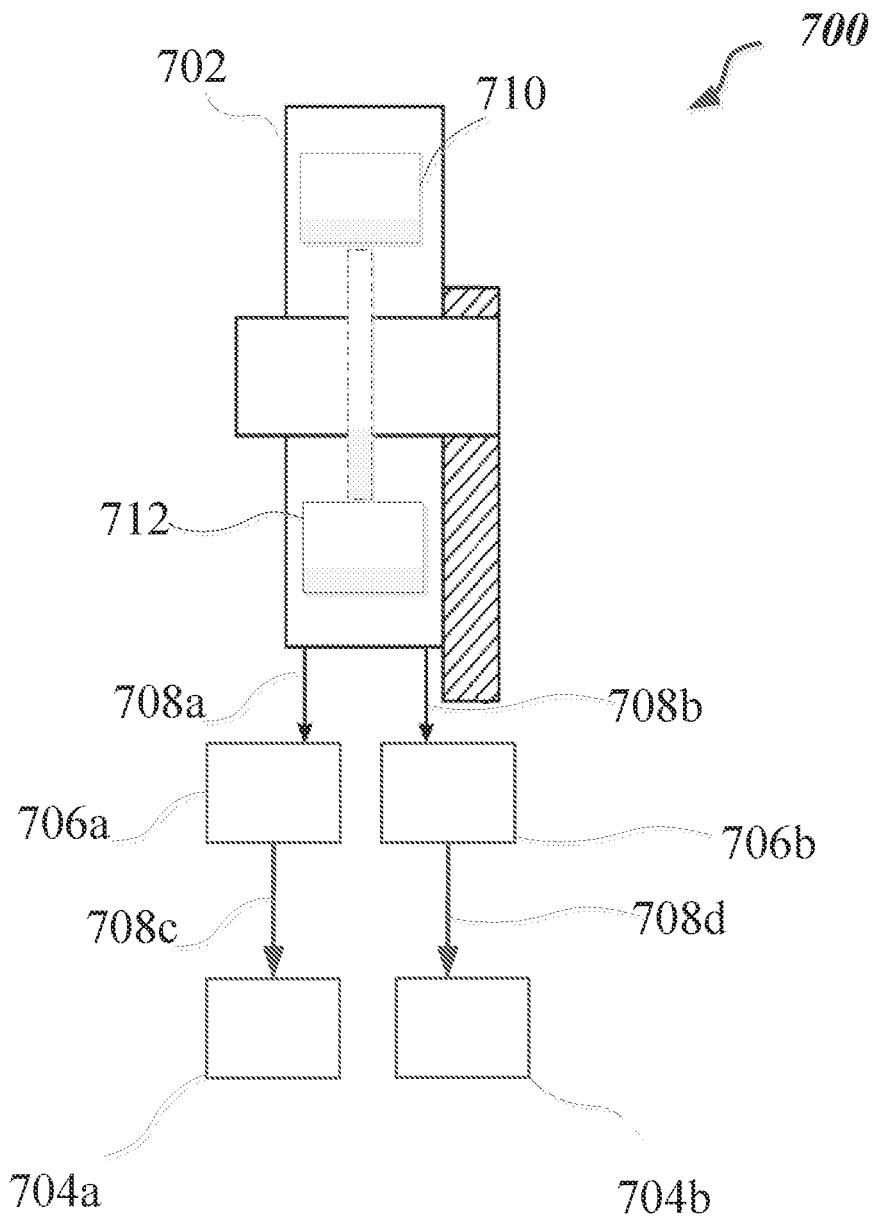
FIG. 7 is an elevation schematic of portions of a hydraulic fracturing system in accordance with further example configurations available using the embodiments herein.

FIG. 7 is an elevation schematic of portions 700 of a hydraulic fracturing system in accordance with further example configurations available in the present disclosure. In this example, a single MPU/FP system is provided. In an example, the FP 704 is a single trailer for fracturing pumps 704a,b. As such, fracturing pumps and fracturing pump trailers are used interchangeably throughout this disclosure. In FIG. 7, the example configuration provides separate transformer skids 706a,b used to step up or step down the voltage for the FP 704a,b. The transformer in transformer skids 706a,b can also be an isolation transformer for filtering out harmonics between the power source (generators) and the load (fracturing equipment in FP 704a,b) with or without changing the voltage. The switch gear 712 is still integrated with the turbine generator 710 and an external switch gear unit may not necessarily be used to act as a common bus or for power distribution. Power cable connections or interconnects 708a,b,c,d are provided to transmit power from the turbine generators 710 that are integrated to the switch gear 712 in the MPU to the respective FPs 704a-f via the transformer skids 706a,b. Interconnects may be implemented in this example as in the examples from FIGS. 5 and 6. A person of ordinary skill would recognize that the embodiments in each of the example configurations may be used interchangeably based on the disclosure herein. As such, one or more power cable interconnects may be configured to couple the mobile unit with a second mobile unit of one or more external mobile units in this and other embodiments. The second mobile unit has at least one second generator and at least one second switch gear and the one or more cable interconnects then enable transmission of power in support of redundancy or load sharing between the mobile unit and the second mobile unit.

The embodiment of FIG. 7 also supports a second implementation where the MPU 702 includes turbine generator 710 and integrated switch gear 712 so as to provide power to one or more pieces of FP equipment in FP unit 704, but the layout of the equipment may be different from the layout of the prior implementation, above, using FIG. 7. For example, in this second implementation using the layout in FIG. 7, the transformer of transformer skid 706a,b (if required) may include a VFD (Variable Frequency Drive) and possibly an MCC (Motor Control Center). As such, the VFD and MCC are on a different separate trailer than the FP 704. This design may allow large fluid pumps to be better positioned relative to wellheads on wellsites, when space is limited. These transformer/VFD/MCC support trailers 706 (in such an embodiment) are herein referred to as Auxiliary Trailers.

Figure 8:
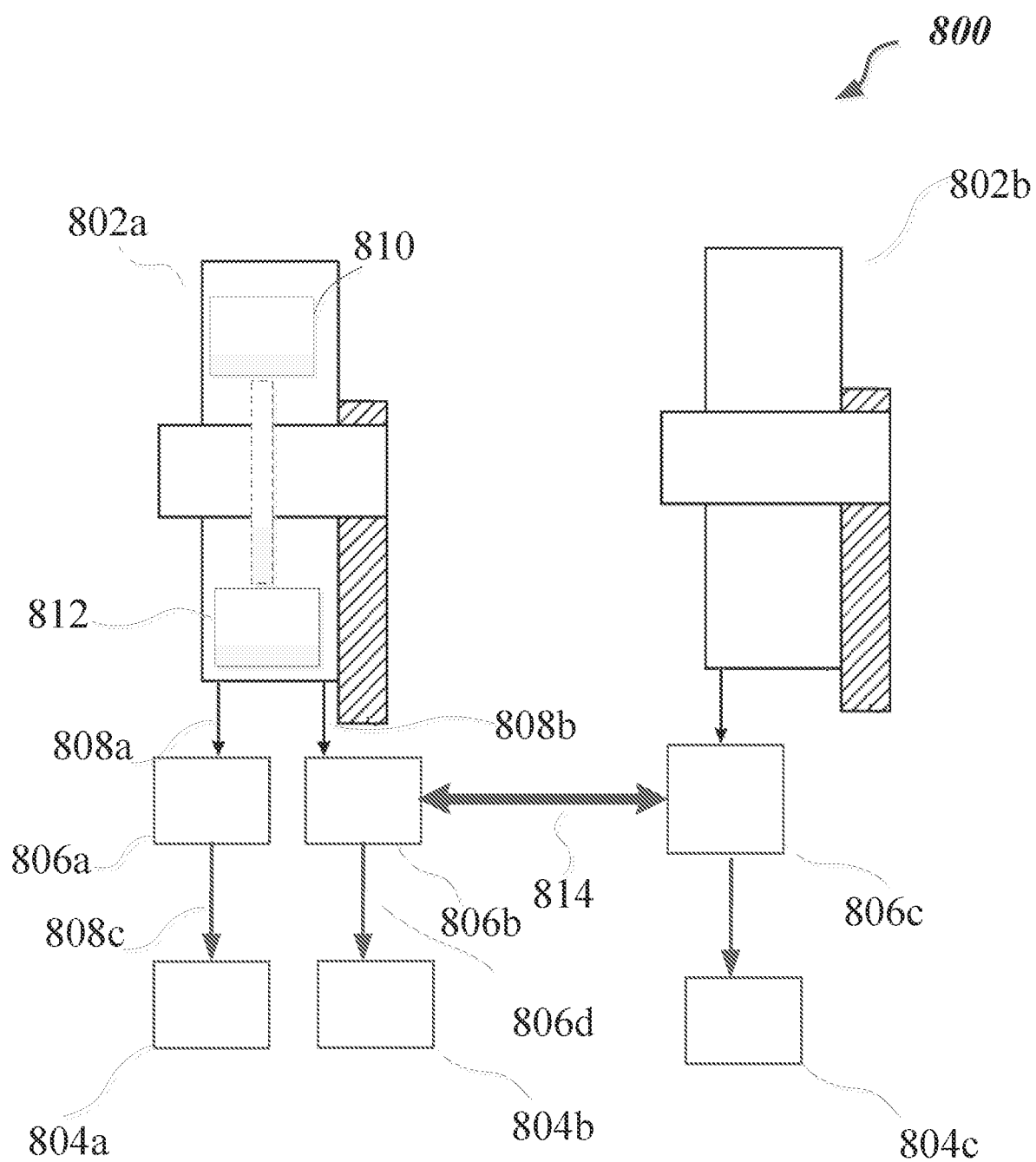
FIG. 8 is an elevation schematic of portions of a hydraulic fracturing system according to other example configurations of the embodiments herein.

FIG. 8 is an elevation schematic of portions 800 of a hydraulic fracturing system according to other example configurations of the present disclosure. This embodiment illustrates load sharing between the transformer skids 806b, c. The remaining reference numerals 802a,b, 810, 812, 808a,b,c,d, 806a, and 804a,b read on similar components or functions from the corresponding reference numerals in FIG. 7—i.e., 702a,b, 710, 712, 708a,b,c,d 706a, and 704a,b. As such, the same discussion from FIG. 7 applies to these components. In addition, in FIG. 8, extra switch gear will need to be integrated into the transformer skid 806b,c which will create a larger skid and will take up more room, or the transformer in the transformer skid 806b,c will need to be downgraded to be smaller, in effect limiting the horsepower of the attached FP unit 804b,c. In this example, load sharing can be on the incoming side of the transformer or the outgoing side (secondary voltage). When the load sharing takes place on the incoming side, the switch gear, bus bars, and cable interconnects is sized based in part on the current available at the generated voltage. When the load sharing equipment is on the outgoing side (e.g., when it can be stepped up or stepped down) then the switch gear, bus bars, and cable interconnects are sized based in part on the current available on the secondary side of the transformer.

In an example, when an interconnect is provided between transformers of at least two mobile units of the one or more external mobile units, as in the embodiment of FIG. 8, then the interconnect for load sharing between the transformers can be configured based at least in part on currents available from a secondary side of the transformer. For example, at least one load sharing switch gear is provided that is optionally associated with at least one of the transformers and configured for load sharing on an incoming side of the at least one of the transformers. This arrangement is such that the at least one load sharing switch gear, associated bus bars, and associated cable interconnects are sized based at least in part on current available for a voltage output of a secondary side of the of the at least one of the transformers. In an alternative or together with the above load sharing example, when the at least one load sharing switch gear is configured for load sharing on an outgoing side of the at least one of the transformers, a different arrangement may be provided. The different arrangement is such that the at least one load sharing switch gear, the associated bus bars, and the associated cable interconnects are sized based at least in part on the current available at the secondary side of the transformer.

Figure 9:
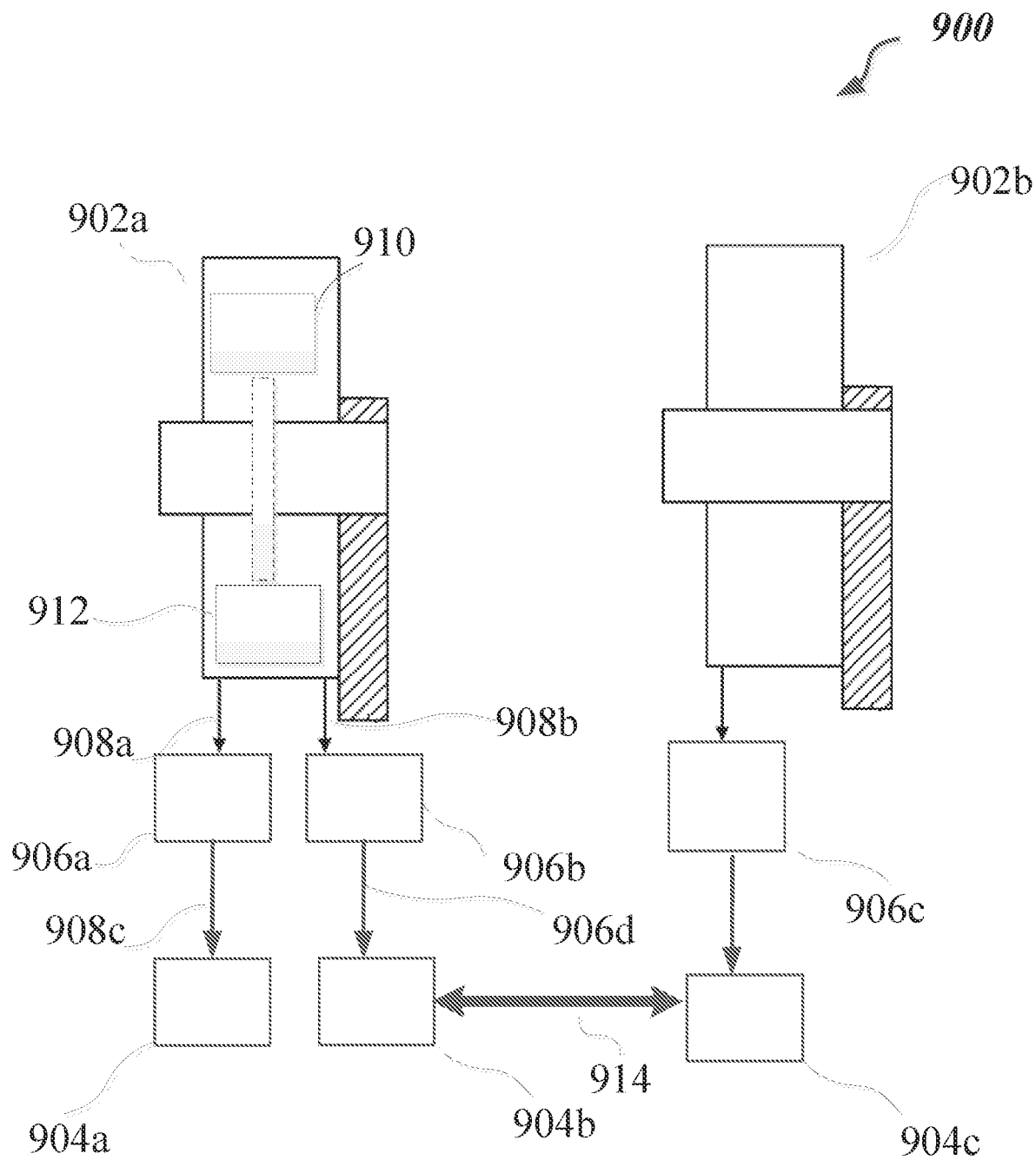
FIG. 9 is an elevation schematic of portions of a hydraulic fracturing system according to other example configurations of the embodiments herein.

FIG. 9 is an elevation schematic of portions 900 of a hydraulic fracturing system according to further example configurations available in the present disclosure. This embodiment illustrates load sharing taking place on the FP units 904b,c. The remaining reference numerals 902a,b, 910, 912, 908a,b,c,d, 906a, and 904a,b read on similar components or functions from the corresponding reference numerals in FIG. 8—i.e., 802a,b, 810, 812, 808a,b,c,d 806a, and 804a,b. As such, the same discussion from FIGS. 7 and 8 applies to these components. When the FP 904b,c have onboard VFD/MCC rooms or compartments, it may be possible to add extra switch gear for load sharing in those rooms. The load sharing will be on the secondary side of the transformer in transformer skid 906a-c. For example, if the transformer in transformer skid 906a-c is stepping the voltage down from 13,800V to 600V, the electrical current requirements will be higher than required if this was not the case. While this may not be ideal current requirements, and will require larger load sharing gear, this implementation saves space on the MPUs 902 at the cost of consuming space on the FP 904, which may be preferable in some cases. In this embodiment, a datavan can possibly perform the load shedding control duties instead of the MPUs 910. As previously noted, datavan is a trailer housing communications and controls for all of the FP equipment for hydraulic fracturing operations where the focus is on the wellhead and fluid pumping instead of power generation. All FP equipment communicate with the datavan for control, when load sharing switch gear is onboard the FP 904, it can be controlled from the datavan instead of the MPU 910.

Figure 10:
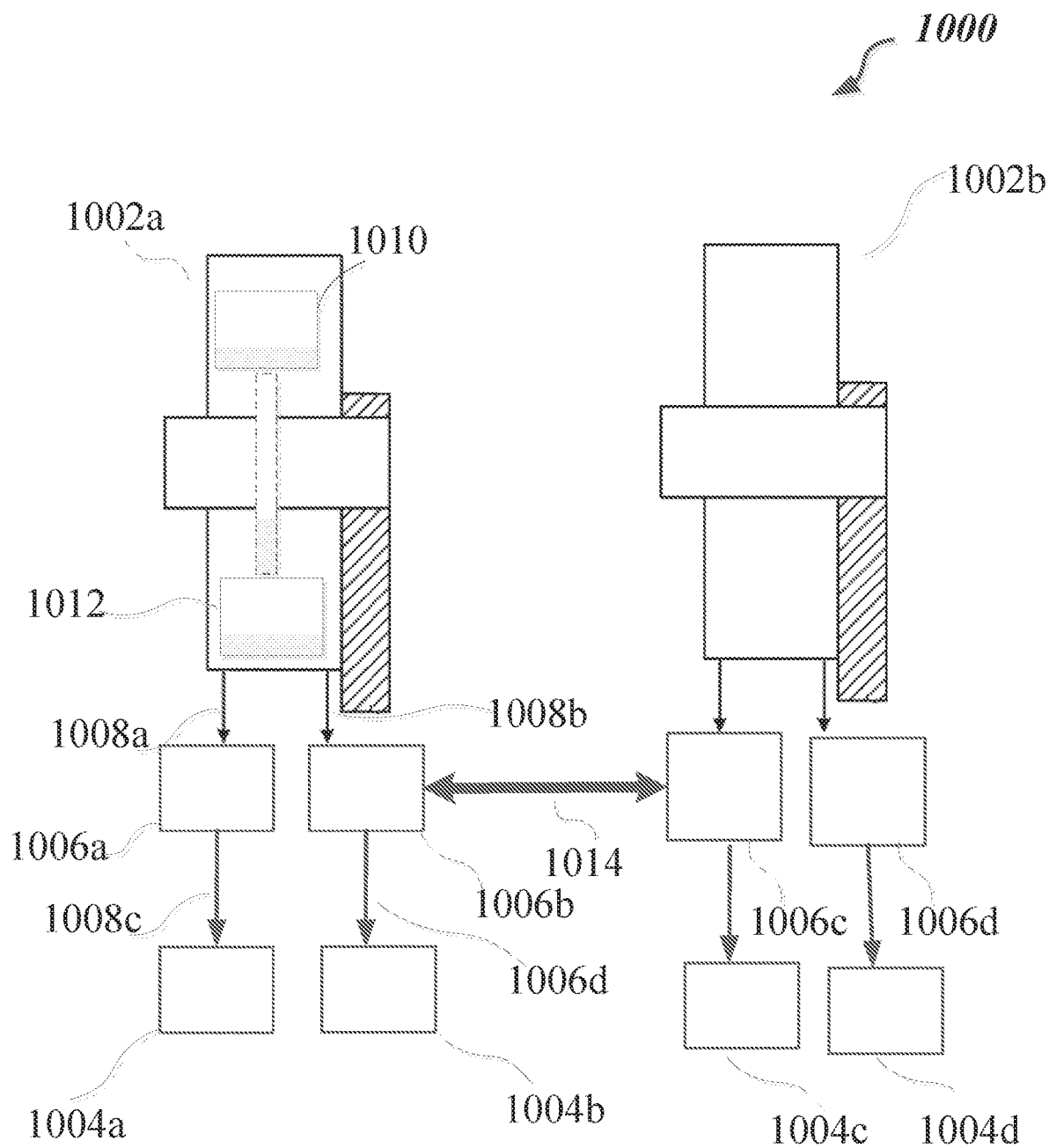
FIG. 10 is an elevation schematic of portions of a hydraulic fracturing system according to other example configurations of the embodiments herein.

FIG. 10 is an elevation schematic of portions 1000 of a hydraulic fracturing system according to yet another example configuration available in the present disclosure. In this embodiment, a configuration and associated method is provided for load sharing where the Auxiliary Trailers 1006b,c (such as described in the alternate embodiment of FIG. 7) houses extra load sharing gear. This configuration saves space on the MPUs 1002 and will allow the load sharing to be on the high voltage side of the transformer. The remaining reference numerals 1002a,b, 1010, 1012, 1008a, b,c,d, 1006a,d and 1004a,b read on similar components or functions from the corresponding reference numerals in FIG. 9—i.e., 902a,b, 910, 912, 908a,b,c,d 906a, and 904a,b. As such, the same discussion from FIGS. 7, 8, and 9 applies to these components. When a step up transformer is used in this embodiment, the load sharing can take place on the secondary side—similarly discussed with respect to FIG. 7. When a step down transformer is used, the load sharing can take place on the primary side. This process also maintains all of the electrical gear off of the FP trailers 1004. Only one load sharing interconnect 1014 is illustrated for simplicity, but in reality, the Auxiliary Trailers 1006b,c can have as many load sharing breakers as need to form as common bus. In many situations, two interconnects may be sufficient, but it is feasible to maintain more available interconnects to simplify interconnecting cable layouts or to electrically bypass failed equipment. Electrical load sharing may be preferable at higher voltages due to the current (amperage) requirements being smaller, therefore smaller cables and switch gear can be used.

In addition, many of the above embodiments show additional switch gear integrated into the MPU to allow load sharing between MPUs for a common bus. In these embodiments, a large three phase power cable may be interconnected between the load sharing switch gear to any adjacent MPUs integrated with other load sharing switch gear. However, the extra gear and a larger internal bus that may be needed to carry the higher electrical current will require compensation in the form of the turbine engines and generators being even smaller to allow mobility of the system.

The above embodiments may be combined in any manner as is readily apparent to a person of ordinary skill reading the present disclosure. In the above embodiments and any combinations therefrom, at least one fracturing pump (FP) mobile unit may be provided as part of one or more external mobile units. The at least one FP mobile unit is physically external relative to the mobile unit having a generator and switch gear for generating power for the at least one FP mobile unit. Further, a predetermined number of FP mobile units include in the one or more external mobile units may be determined for the system described throughout this disclosure. The predetermined number of FP mobile units may be determined by a maximum of the power available from the at least one generator and handled by the at least one switch gear.

In a further example, a predetermined number of generators including the at least one generator may be determined for the system of the present disclosure. In an aspect, the predetermined number of generators is determined such that each of the predetermined number of generators has a power output value that is lesser than a power output of an isolated single generator occupying all available space in an independent mobile unit physically external to the mobile unit. As the generator and switch gear are being integrated to a singular and integrated mobile unit, the space is limited and lower rating equipment may be provided instead. Other embodiments to the above embodiments allow for extra integrated switch gear for a common bus integrated into the FP trailers or with an external transformer and/or VFD skids—i.e., in the Auxiliary Trailers. This extra integrated switch gear may require additional space consumption which may force the FP trailer to incorporate equipment with lower hydraulic horsepower rating due to smaller motors/pumps to allow all of these components to fit onto a mobile platform. Further, large three phase cables, or multiple single phase cables can be used for electrical power interconnects. The above embodiments are described as capable of supporting several common voltages, such as 25 KV, 13.8 KV, 6.6 KV, 4160V, 2000V, 600V, 690V, 480V, all at +/−5%. However, any voltage is feasibly based on the capabilities of the generators used and on the ratings of the components requiring the generated power. For load sharing capabilities, higher voltage may be better appreciated and issues may arise with voltages below 5,000V. While it may not be possible to practically size switch gear, bus bars, and interconnecting cables to be able to handle the electrical current for an entire fracturing fleet at voltages below 5,000V to form a common bus, minor load sharing between two individual pumps (FP units) may still be possible even at low voltages.

The technology herein can be used for equipment where the voltage is constant, such as when the load operates at the same voltage as the generated voltage. Alternatively, the technology and equipment herein can be used where step up or step transformers are used to alter the voltage for the attached load (FP units). Examples of components in the FP units include blenders, hydration units, chemical units, proppant equipment, lights, auxiliary water pumps, monitoring equipment, data collection offices, personnel trailers, cranes, gas compression equipment, gas filtering equipment, heating equipment, and other third party equipment that is used on well sites.

Figure 11:
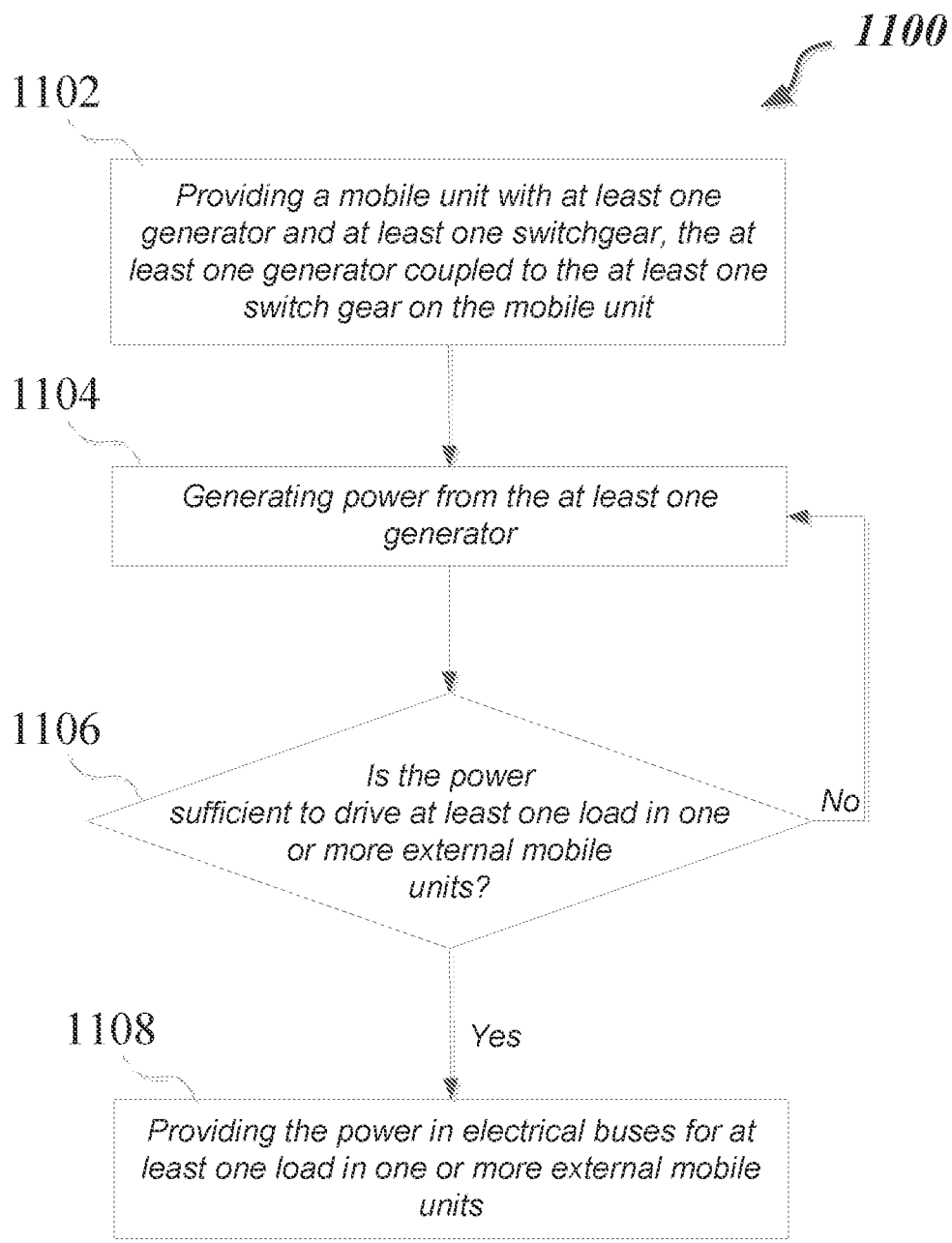
FIG. 11 is a flowchart of a hydraulic fracturing method using the example configurations of the embodiments herein.

FIG. 11 is a flowchart 1100 of a hydraulic fracturing method using to example configurations of the embodiments herein. The method includes a sub-process 1102 for providing a mobile unit with at least one generator and at least one switchgear, such as a system as described above. The at least one generator is coupled to the at least one switch gear on the mobile unit. The method includes sub-process 1104 for generating power from the at least one generator. The system may be part of a hydraulic fracturing system that consumes the power and that includes a wellbore and at least one pressuring system to create fractures in a subterranean formation that surrounds the wellbore. A verification is performed via sub-process 1106 for the power generated being sufficient to drive at least one load of the one or more external mobile units. When such verification is positive, sub-process 1108 provides the power in electrical busses for at least one load in the one or more external mobile units. Power may be generated via sub-process 1104 till the capacity is achieved if the verification in sub-process 1106 is negative.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

In the various embodiments of the disclosure described, a person having ordinary skill in the art will recognize that alternative arrangements of components, units, conduits, and fibers could be conceived and applied to the present invention.

The singular forms "a," "an," and "the" include plural referents, unless the context clearly dictates otherwise.

Examples of computer-readable medium used in the datavan and in the communications achieved in the present embodiments can include but are not limited to: one or more nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described previously and can operate on a computer. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiments are contemplated by embodiments of the present disclosure.

What is claimed is:

1. A system comprising:
a first mobile unit comprising at least one generator and associated with a common bus bar that is sized to support voltage and current outputs of a second mobile unit in a load sharing arrangement with the first mobile unit and that is also sized to redistribute an excess power from the at least one generator to at least one load on one or more external mobile units that is powered by the load sharing arrangement.

2. The system of claim 1, further comprising:
at least one transformer and an interconnect associated with the common bus bar and with at least one switch gear, the at least one switch gear to be also sized to the voltage and current outputs of the second mobile unit in the load sharing arrangement with the first mobile unit.

3. The system of claim 1, wherein the system is part of a hydraulic fracturing system that contributes to voltage and current requirements of the at least one load on the one or more external mobile units, the at least one load comprising a wellbore and at least one pressuring system to create fractures in a subterranean formation that surrounds the wellbore.

4. The system of claim 1, further comprising:
at least one fracturing pump (FP) mobile unit of the one or more external mobile units, the at least one FP mobile unit physically external relative to the first mobile unit, wherein at least one transformer is provided to condition the excess power to satisfy voltage and current requirements to the at least one FP mobile unit.

5. The system of claim 1, further comprising:
a predetermined number of FP mobile units comprised in the one or more external mobile units, the predetermined number of FP mobile units determined by a maximum power available from the excess power.

6. The system of claim 1, further comprising:
a predetermined number of first generators comprising the at least one generator, the predetermined number of first generators having individual power output values that is lesser than a power output of an isolated single generator occupying all available space in an independent mobile unit physically external to the first mobile unit.

7. The system of claim 1, further comprising:
the at least one switchgear being physically arranged to replace an electronic equipment room (EER) of at least one of the one or more external mobile units that is designed to comprise the EER.

8. The system of claim 1, further comprising:
at least one Variable Frequency Drive (VFD); and
at least one Motor Control Center (MCC), the VFD and the MCC being on individual ones of the one or more external mobile units that is physically external relative to the first mobile unit.

9. The system of claim 1, further comprising:
an interconnect configured to couple the first mobile unit with the second mobile unit, the second mobile unit having at least one switch gear in addition to a second generator, the interconnect, along with the common bus bar, to transmit power that is less than the excess power in support of redundancy in addition to the load sharing arrangement between the first mobile unit and the second mobile unit.

10. The system of claim 1, further comprising:
at least one switch gear configured in the load sharing arrangement by being in part on an incoming side of at least one transformer, a sizing of the at least one switch gear based at least in part on current available for a voltage output of a secondary side of the at least one transformer that is coupled to the at least one generator and to a second generator of the second mobile unit; or
at least one switch gear configured in the load sharing arrangement by being in part on an outgoing side of the at least one transformer, the sizing of the at least one switch gear based at least in part on current available at a secondary side of the at least one transformer that is coupled to the at least one generator and to a second generator of the second mobile unit.

11. A method comprising:
providing a first mobile unit comprising at least one generator and associated with a common bus bar that is sized to support voltage and current outputs of a second mobile unit in a load sharing arrangement with the first mobile unit; and
enabling a sizing of the common bus bar to redistribute an excess power from the at least one generator to at least one load on one or more external mobile units that is powered by the load sharing arrangement.

12. The method of claim 11, further comprising:
associating at least one transformer and an interconnect with the common bus and with at least one switch gear, the at least one switch gear to be also sized to the voltage and current outputs of the second mobile unit in the load sharing arrangement with the first mobile unit.

13. The method of claim 11, further comprising:
enabling a hydraulic fracturing system that contributes to voltage and current requirements of the at least one load on the one or more external mobile units, the at least one load comprising a wellbore and at least one pressuring system to create fractures in a subterranean formation that surrounds the wellbore.

14. The method of claim 11, further comprising:
providing at least one fracturing pump (FP) mobile unit of the one or more external mobile units to be physically external relative to the first mobile unit; and
conditioning, using at least one transformer, the excess power to satisfy voltage and current requirements to the at least one FP mobile unit.

15. The method of claim 11, further comprising:
determining a predetermined number of FP mobile units based at least in part on a maximum power available from the excess power; and
providing the predetermined number of FP mobile units comprised in the one or more external mobile units.

16. The method of claim 11, further comprising:
determining a predetermined number of first generators having individual power output values that is lesser than a power output of an isolated single generator occupying all available space in an independent mobile unit physically external to the first mobile unit; and
providing the predetermined number of first generators to comprise the at least one generator.

17. The method of claim 11, further comprising:
physically arranging the at least one switchgear to replace an electronic equipment room (EER) of at least one of the one or more external mobile units that is designed to comprise the EER.

18. The method of claim 11, further comprising:
providing at least one Variable Frequency Drive (VFD) and at least one Motor Control Center (MCC) on individual ones of the one or more external mobile units that is physically external relative to the first mobile unit.

19. The method of claim 11, further comprising:
coupling the first mobile unit with the second mobile unit using an interconnect, the second mobile unit having at least one switch gear in addition to a second generator; and
transmitting power that is less than the excess power, using the common bus bar and the interconnect, in support of redundancy in addition to the load sharing arrangement between the first mobile unit and the second mobile unit.

20. The method of claim 11, further comprising:
providing at least one switch gear configured in the load sharing arrangement by being in part on an incoming side of at least one transformer, a sizing of the at least one switch gear based at least in part on current available for a voltage output of a secondary side of the at least one transformer that is coupled to the at least one generator and to a second generator of the second mobile unit; or
providing at least one switch gear configured in the load sharing arrangement by being in part on an outgoing side of the at least one transformer, the sizing of the at least one switch gear based at least in part on current available at a secondary side of the at least one transformer that is coupled to the at least one generator and to a second generator of the second mobile unit.

* * * * *